Clifford E. Anderson
Ellis M. Zacharias, Jr.
INVENTORS

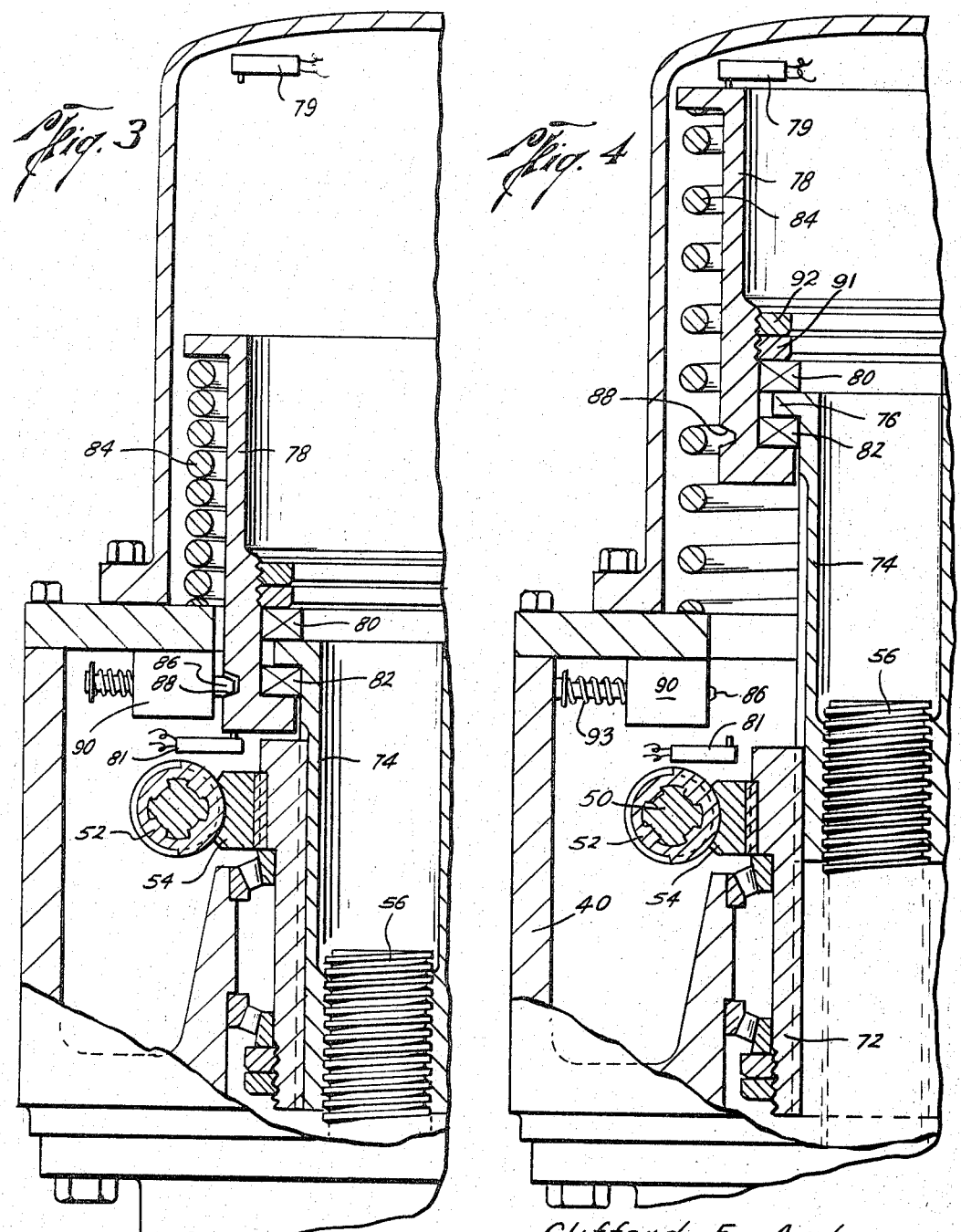

Clifford E. Anderson
Ellis M. Zacharias, Jr.
INVENTORS

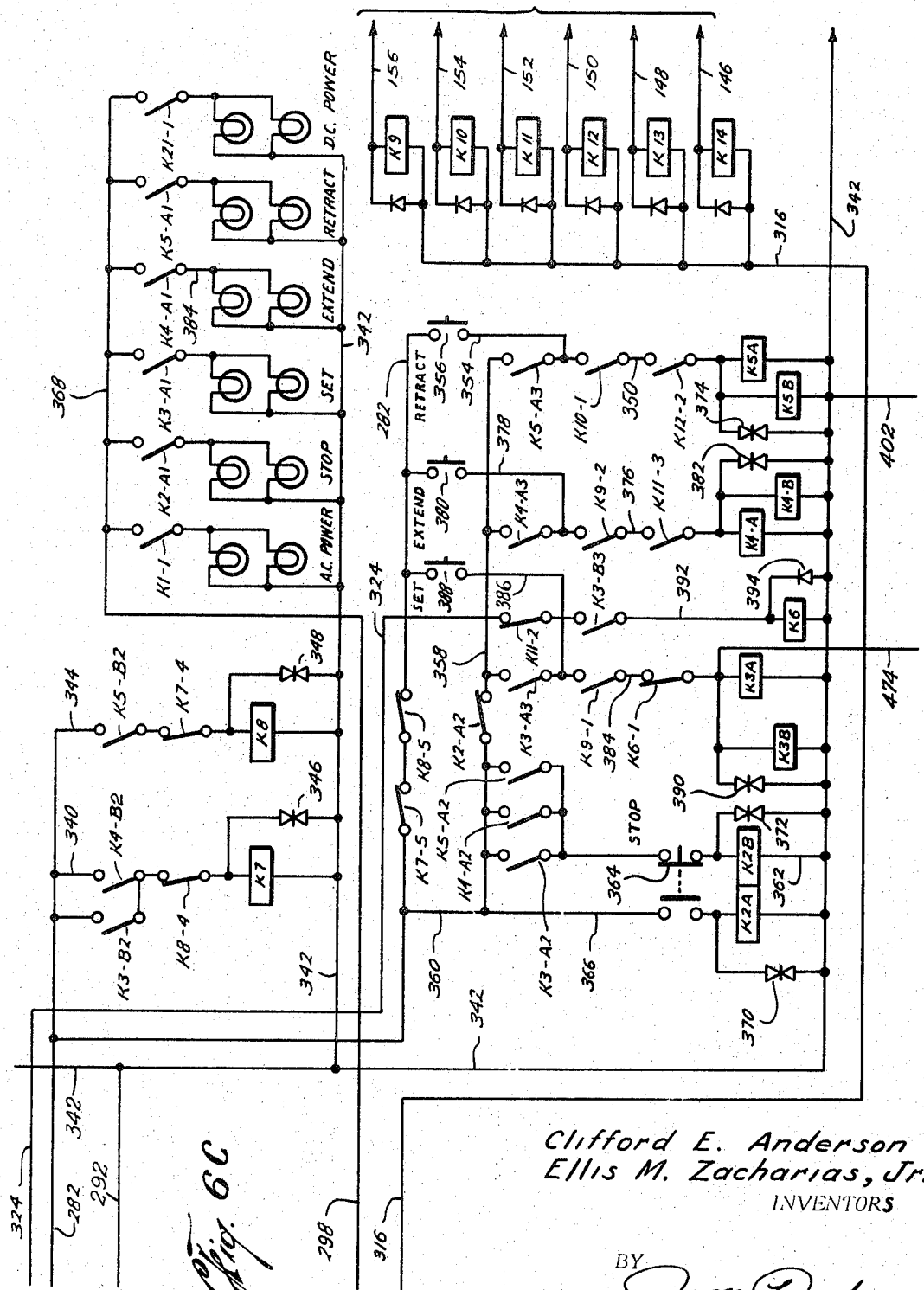

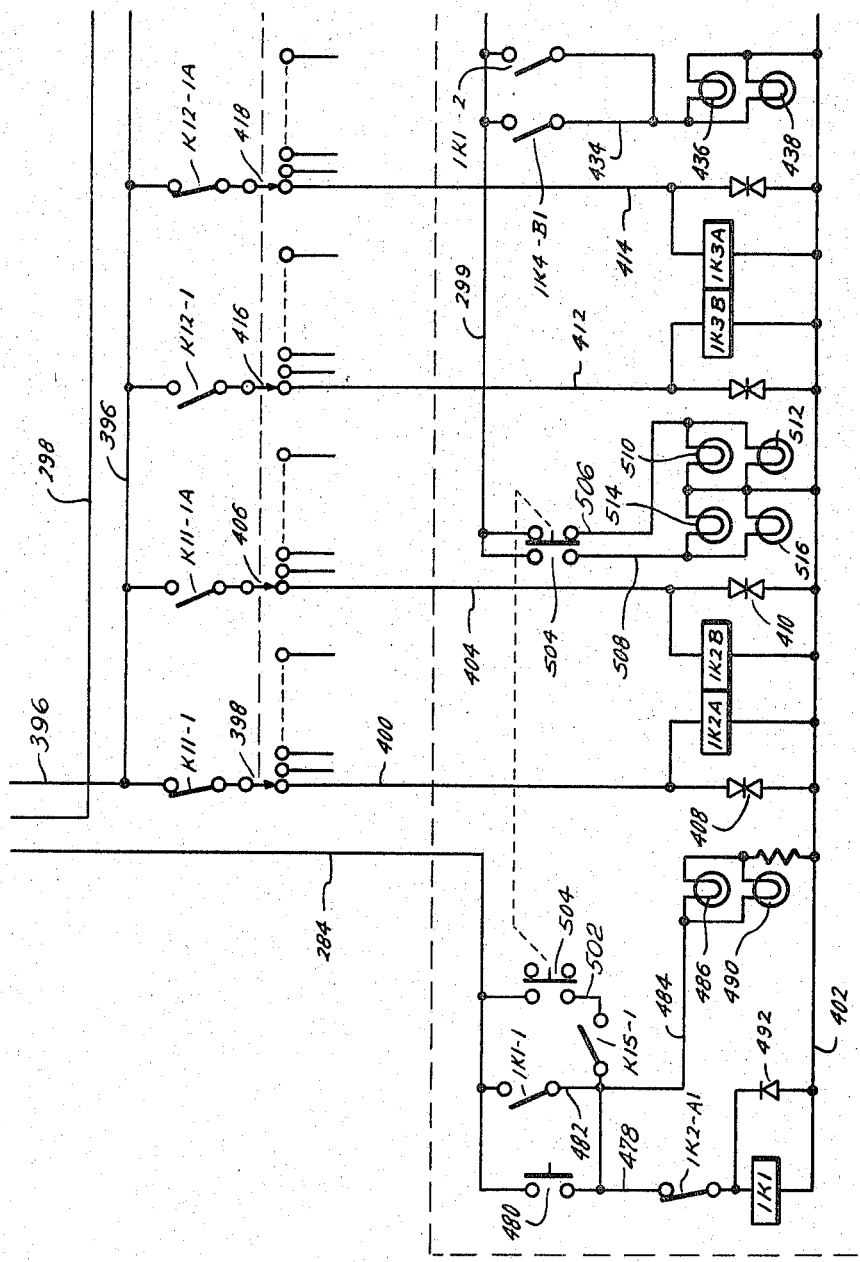

Clifford E. Anderson
Ellis M. Zacharias, Jr.
INVENTORS

United States Patent Office 3,422,329
Patented Jan. 14, 1969

3,422,329
SYSTEM FOR CONTROLLING REMOTELY LOCATED ELECTRICALLY ENERGIZED POWER OPERATOR DEVICES
Clifford E. Anderson, Houston, Tex., and Ellis M. Zacharias, Jr., Ridgewood, N.J., assignors to ACF Industries, Incorporated, New York, N.Y., a corporation of New Jersey
Filed Oct. 19, 1965, Ser. No. 497,931
U.S. Cl. 318—103                9 Claims
Int. Cl. H02p 1/54; H02j 9/00

ABSTRACT OF THE DISCLOSURE

An electrically energized system for the selective control of a plurality of remotely located mechanical devices such as valve operators and the like. The system provides for selective control of an operational sequence for a particular one of a plurality of mechanical devices and also provides for automatic operation of the mechanical devices either singly or plurally in response to predetermined conditions such as excessive pressure, insufficient pressure and the like. The system also provides for maintenance of the status of the mechanical devices and for continuous monitoring of the devices through an auxiliary battery power supply in the event of failure of the primary power supply source.

---

This application is directed generally to power operator devices for controlling mechanical devices such as valves and the like, and more particularly, to the control of remotely located electrically energized power operator devices.

Electrically driven and hydraulically driven power operators for controlling mechanical devices such as valves, blowout preventers, and the like have both enjoyed extensive use for controlling the flow of fluid in pipelines or fluid processing systems. Electric and hydraulic power operator systems for land based fluid flow control facilities have both been provided with remote control apparatus for controlling the operation thereof from remotely located control facilities. Considerable difficulty arises concerning remote control, however, when the mechanical device to be controlled by a power operator is located below the surface of a body of water such as the ocean. For example, there have been considerable technological advances in recent years concerning the drilling and completion of offshore petroleum wells. While some petroleum wells are completed above the surface of the ocean by locating a wellhead assembly for controlling the well on a platform or the like, in view of well completion technology advances, it has become practical to locate the wellhead assembly on the ocean floor where it is safe from damage by wave action during storms. Also, when the well is drilled in deep water, it is often imperative that the wellhead assembly be located on the ocean floor. Fluid flowing from wellhead assemblies located on the ocean floor is generally transported by pipelines, also located on the ocean floor, to land based fluid storage facilities or to storage facilities located on floating storage vessels.

For controlling the flow of fluids from such surface wellhead assemblies, generally a number of power operator devices are connected to the wellhead assembly and are adapted, when energized, to control opening or closing of the valves thereof. It has generally heretofore been considered impractical to provide remotely controllable electrically energized power operator devices for submerged valves for a number of reasons. While electrically energized land based power operators are quite practical, the large amount of intricate and delicate mechanical switching apparatus required to provide specific operator functions is a prime consideration contributing to the prohibitiveness of submerged electric power operators. Should the mechanical switching apparatus of a land based electrically energized power operator become inoperative due to mechanical failure, it is a simple matter for a repairman to gain access to the circuitry of the power operator and replace or repair that portion of the mechanical switching equipment which has become inoperative. It is therefore apparent why reliability of the power operator construction is a prime consideration when the power operator is to be submerged in a body of water such as the ocean. A repair operation, therefore, involving replacement of a small part such as a switch or a resistor, etc., which is required to restore the power operator to working condition, while being generally inexpensive in nature, may be extremely difficult or even impossible to accomplish when considering repair or replacement of electrical equipment under water.

Hydraulic equipment has generally been employed in the provision of power operators for controlling underwater valves and the like, specifically because of its reliability. Hydraulically energized power operators, however, have a number of distinct disadvantages which in general have contributed to the development of electrically energized power operators and operator control systems, which are the subject of the present invention. Hydraulically energized power operators generally provide no positive feedback of information so that the specific condition of the power operator can be determined at all times. It is generally highly desirable and frequently imperative that the condition of the wellhead valves be positively identifiable at all times.

A particular disadvantage involved in the use of hydraulically energized undersea control apparatus concerns the amount of hydraulic piping necessary for conducting hydraulic fluid to the remotely located hydraulic operator in sufficient pressure ranges for expedient operation of the hydraulic operator. It has been roughly estimated that a hydraulic fluid line for transporting hydraulic fluid to a remotely located power operator must be at least one inch in diameter for every mile of distance due to the pressure loss from friction between the line and the hydraulic fluid. For example, it is estimated that hydraulic piping for a mechanical device located five miles from the source of hydraulic control would require hydraulic piping at least five inches in diameter. The cost of double line hydraulic control piping for control of such a remotely located undersea device could be exceedingly expensive.

The tendency for the development of undersea electric operators has been brought about in part by the location of wellhead assemblies in extremely deep water, which in the case of hydraulic power operator constructions, would generally require extremely expensive hydraulic control installations.

It has been heretofore considered impractical to provide groups of undersea valves, such as may be found in pipelines and wellheads, with individual selectively actuatable fail-safe devices for moving a selected one of the valves between open and closed positions to the exclusion of the other valves in the group. For example, hydraulically actuated valves of an undersea wellhead are generally arranged for simultaneous control since they can be controlled through a single hydraulic circuit. It is generally considered good practice to preserve the integrity of the wellhead systems by refraining from moving the master valves until it becomes absolutely necessary to do so. The master valves provide a safety factor and must be able to provide positive sealing when all else fails.

Automatic control of one or more of the valves of a remotely located or submerged wellhead in response to predetermined high or low pressures has also been a sophistication beyond the capability of most undersea wellhead assemblies.

It is therefore a primary object of this invention to provide an electrically energized power operator construction which is adapted for submersion.

It is a further object of this invention to provide a novel electrically energized submersible power operator construction for controlling mechanical devices and which includes electrical circuitry located within or adjacent to the power operator and which is substantially free of mechanical circuit control apparatus.

It is a further object of this invention to provide a novel electrically energized submersible power operator construction which provides a positive feedback of information to indicate the position of the power operator and the mechanical device in all positions of operation.

It is a further object of this invention to provide a novel electrically energized submersible power operator construction and a control facility therefor which allows simultaneous or selective operation of one of more selected power operator devices from a remotely located control facility.

Another object of this invention contemplates the provision of a novel electrically energized power operator and a control system therefor which is adapted to control one or more remotely located power operator devices by means of a single control cable having common electrical power and control circuits therein.

It is among the several objects of this invention to provide a novel control system including nonmechanical apparatus for each of the motors of a plurality of remotely located mechanical devices and including electronic switching of the electrical circuitry of the motors for individual or collective electrical connection thereof to a single motor power circuit.

It is an even further object of this invention to provide a novel control system for selectively or automatically moving a single valve to its safe position or simultaneously moving a plurality of valves to their respective safe positions in response to the occurrence of a predetermined condition of the system or in response to failure of the source of power controlling the system.

It is an object of this invention to provide a novel electrically energized control system for actuating a plurality of remotely located mechanical devices which is adapted to maintain the status of the system in the event of failure of the source of electrical power.

Briefly, the invention generally involves electrically energized remotely located power operator devices for imparting controlling movement to associated mechanical devices such as production valves, pipeline valves, blowout preventers, etc. More specifically, the invention is directed to electronic circuitry for controllably energizing a reversible electrical motor which is in driving association with the power operator device and to remote control of a plurality of remotely located power operator devices from a common control point. The invention also involves automatic or selective control of remotely located power operator devices responsive to predetermined unsafe pressure condition within the mechanical devices and is adapted for selective or automatic movement of the mechanical device to a safe position at any time either automatically, responsive to an unsafe condition or the power failure, or by selective manual control. A primary concept of the invention involves the control of a plurality of remotely located electrically energized power operator devices from a single control point and employing a single control cable for electrical connection between the control circuitry at the control point and the various electrical operating circuitry of the individual power operator devices.

Other and further objects of the invention will become obvious upon an understanding of the illustrated embodiment about to be described, or will be indicated in the appended claims and various advantages not referred to herein will become apparent to one skilled in the art upon the employment of the invention in practice.

Preferred embodiments of the invention have been chosen for purpose of illustration and description and are shown in the accompanying drawings forming a part of the specification wherein:

FIGURES 3 and 4 are sectional views in elevation of an electrically energized power operator having a fail-safe mechanism and illustrating the operational sequence of the fail-safe mechanism.

FIGURES 6A, 6B and 6C are schematic illustrations of the common control circuitry of the control system.

FIGURES 6D and 6E are schematic illustrations of a typical individual control circuit for controlling movement of and visually indicating the position of one of the plurality of power operator devices.

Figure 1:
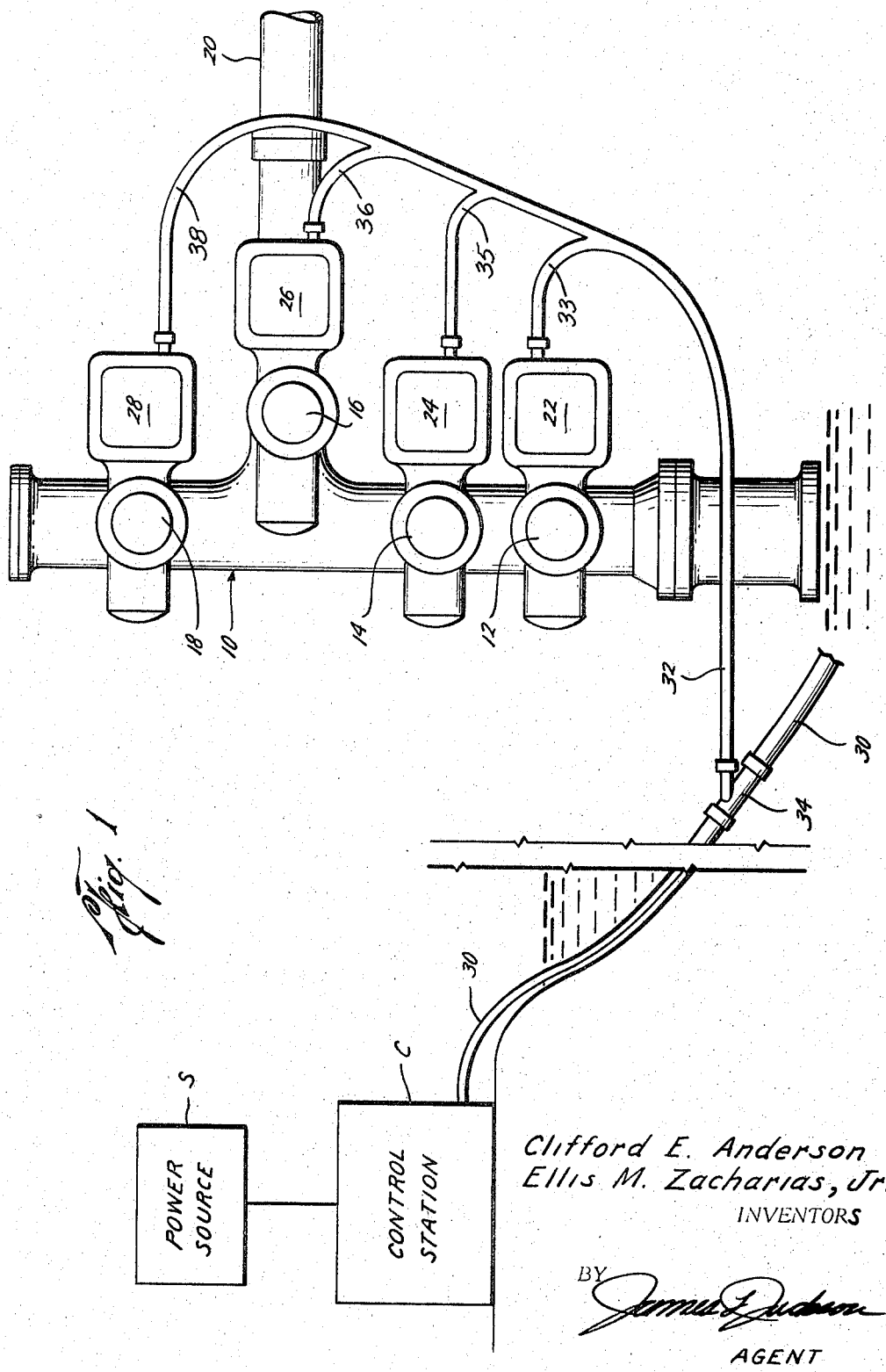
FIGURE 1 is a partial elevational view and fragmentary schematic view illustrating a wellhead assembly located on the ocean floor which is provided with electrically energized power operators and is controlled in accordance with the spirit and scope of the instant invention.

Referring now to the drawings for a better understanding of the invention, in FIGURE 1, there is illustrated a wellhead assembly which is positioned on the ocean floor and which has a bottom master valve 12, a top master valve 14, a wing valve 16 and a swab valve 18 for controlling the flow of fluid from the well to a flow line 20. Each of the wellhead valves is provided with an electrically energized remotely controllable power operator 22, 24, 26 and 28, respectively, for controlling the operation of the wellhead valves.

For remote control of the power operators of the wellhead assembly, a control station C is located above the surface of the ocean either on land or on a floating control facility or offshore platform. The control station C is provided with a source S of electrical energy, and in turn supplies electrical energy to the individual electrically energized power operators of the wellhead assembly for operation thereof. A single main control cable 30 is connected at one end thereof to the control station C and the other extremity thereof extends to the vicinity of the wellhead assembly 10. The primary cable 30 is provided with sufficient power and control circuitry for energization and control of one of the electrically energized power operators 22, 24, 26 and 28, and in addition, includes an electrical command circuit for each of the power operator devices. For example, as illustrated in FIGURE 1, the primary cable 30 would be provided with at least four command circuits, one for each of the power operator devices. If the control system is designed to control the valves of more than a single wellhead assembly, the primary cable 30 must be provided with a single command circuit for each of the valves or other mechanical devices for which power operation may be desired.

A branch cable 32 is interconnected with the primary cable 30 by suitable connection structure 34. The branch cable 32 is provided with the same number of power and operator control circuits as is provided in the primary cable 30 and includes a single command circuit for each of the power operators for which control is desired. The branch cable 32 is formed into a harness at one extremity thereof branching the power circuitry and the command circuits to the respective power operators. Suitable electrical switching circuitry to be described in detail hereinbelow is disposed within the power operator housing 24 and serves to electrically connect the power circuitry of a selected one or more of the power operators to the power circuitry of the single branch cable 32 for operation of the selected power operator or operators to the exclusion of the other operators. Secondary electrical cables 33, 34, 36 and 38 are respectively connected to the power operators 22, 24, 26 and 28 and include circuitry connecting the electrical circuitry of the power operator to the electrical switching circuitry. The particular structural connection between the primary cable, branch cable and secondary or auxiliary cable is considered illustrative rather than limiting in regard to this invention since other connecting arrangements may be employed within the spirit and scope of this invention.

Figure 2:
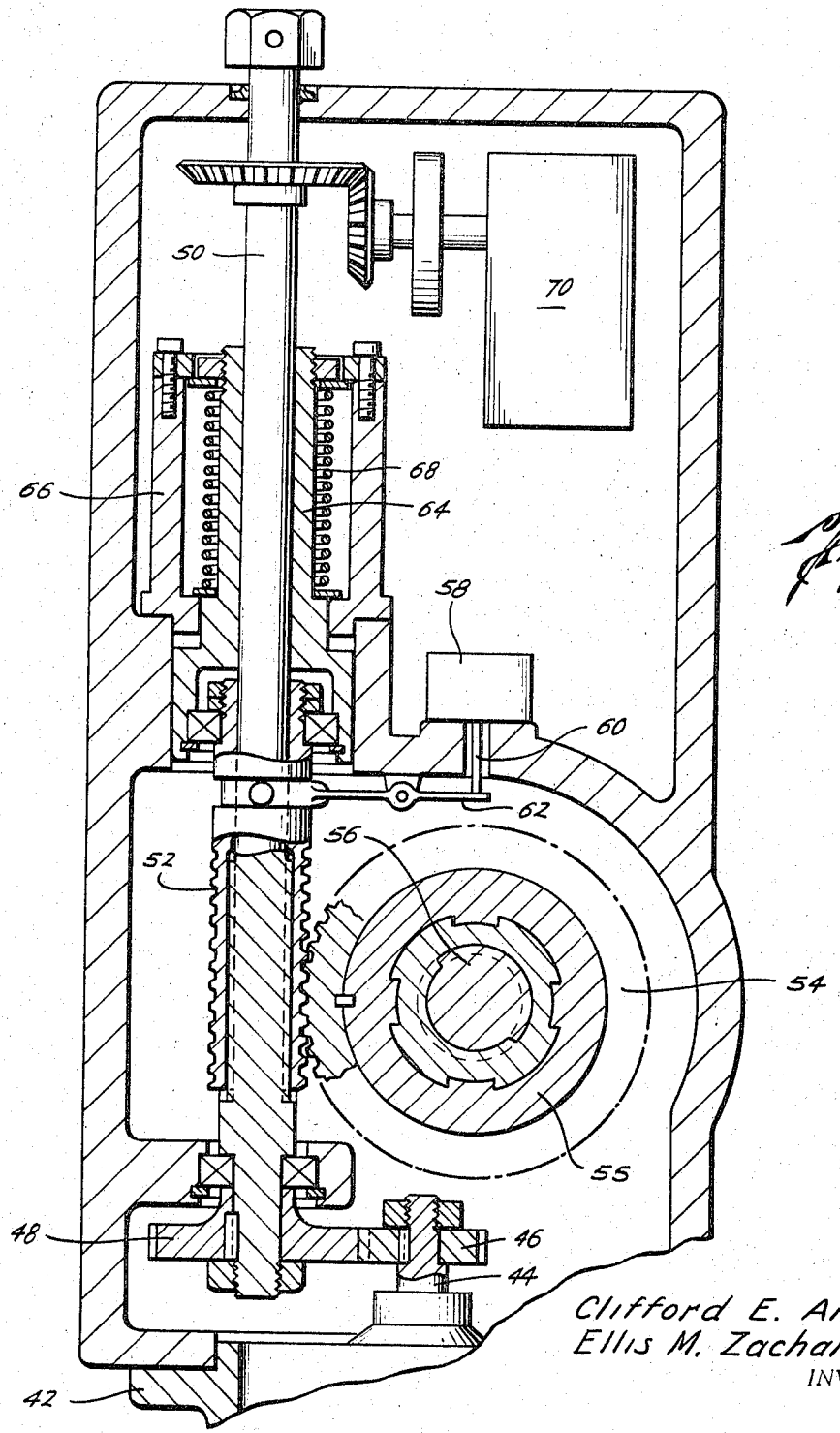
FIGURE 2 is a sectional view in plan of the power operator of FIGURES 3 and 4, illustrating gear limit switch and torque responsive control concept of the invention.

As illustrated in FIGURE 2, a typical power operator construction is illustrated which includes a power operator housing 40 to which is attached an electrical motor 42. A rotary drive shaft 44 of the motor 42 is provided with a pinion gear 46, which is adapted to drive a gear 48 of an operator drive shaft 50. A worm 52 is nonrotatably fixed to the drive shaft 50 and is adapted upon being rotated to impart rotation to a worm gear 54. The worm gear 54 is interconnected with a valve stem drive construction 55, which in turn is adapted for threaded interengagement with the valve stem 56 of a typical valve. For operation of valves of the type generally employed in wellhead assemblies, the valve stem 56, by its threaded interengagement with the drive structure 55, will impart longitudinal translation to the valve stem 56, thereby moving the gate portion of the valve as desired. It is to be understood, however, that the instant invention is not limited to gate valve structures having rising stems for the operation thereof. For example, the valve or mechanical device to be operated may be actuated by rotary movement of the valve stem 56. There would merely be provided a nonrotable connection between the valve stem and the worm gear and rotation of the worm gear would impart rotation to the valve stem and consequently to the valve. This would adapt the power operator for controlling rotary valves such as spherical and cylindrical plug valves and the like.

To protect the power operator against possible damage, in the event of mechanical failure of the valve or in the event of an obstruction becoming lodged within the valve, a torque switch 58 having a switch actuator stem 60 is fixedly attached to the housing structure. An operator arm 62, which is pivotedly connected to the housing structure, is engageable with a portion of the worm 52 and is actuated by a longitudinal movement of the worm 52 for imparting longitudinal movement to or allowing longitudinal movement of the stem 60 of the torque switch 58 depending upon the direction of motor rotation.

A torque sleeve 64, which is retained within a torque sleeve bracket 66 is rotatably connected through suitable bearing structure to the worm 52. The torque sleeve 64 is movably retained within the torque sleeve bracket 66 and is retained in a preselected position relative to the torque switch bracket by a compression spring 68. Should the valve stem 56 become difficult or impossible to move due to an obstruction within the valve or due to mechanical failure of a portion of the valve, the worm 52 being longitudinally movable relative to the shaft 50 will be driven against the bias of the spring 68, thereby pivoting the arm 62 and causing the control stem 60 to actuate the torque switch 58. During the operation of the electrical motor 42 of the power operator, the torque switch is normally in a closed condition allowing the flow of current therethrough. Upon longitudinal movement of the operator shaft 50 in either direction, the torque switch will open the electrical circuit, thereby deenergizing the motor 42 to prevent damage to the motor 42 by overload.

A gear limit switch 70 is fixedly retained within the operator housing and is driven directly from the operator shaft 50 by suitable gearing arrangement to cause deenergization of the electrical motor 42 upon reaching a predetermined number of operator shaft revolutions. The limit switch 70, therefore, is adapted to cause deenergization of the electric motor 42 as the gate member of the valve reaches a fully open or fully closed condition.

With reference now to FIGURES 3 and 4, a base portion of the operator housing 40 is provided with an annular internal sleeve which retains thrust bearings for rotatably supporting a tubular drive sleeve 72. A worm gear 54, nonrotatably fixed adjacent one extremity of the drive sleeve, is in driven engagement with a worm 52 carried by the motor driven shaft 50 and is adapted, upon rotation of the motor driven shaft 50, to impart vertical movement to the stem 56. The internal periphery of the drive sleeve 72 is provided with a series of internal splines which mate with external splines, formed on a tubular drive shaft 74, to provide a nonrotatable support connection between the drive shaft and the drive sleeve. The drive shaft 74 is internally threaded at its lower extremity and receives the external threads of the valve stem 56 for imparting longitudinal movement to the valve stem, as will be discussed in detail hereinbelow. A thrust support flange 76, formed integral with the drive shaft 74, is disposed between thrust bearings 80 and 82 which maintain the drive shaft 74 in rotatable connection with a spring retainer member 78. The spring retainer member 78 has an anular flange formed at the lower extremity thereof for supporting the thrust bearing 82. A thrust nut 91 is threadedly received within the spring retainer 78 and is maintained in locked position by a lock nut 92 to provide a thrust support for the thrust bearing 80.

A latch mechanism including at least one latching detent 86 is fixed to the interior wall structure of the operator in any desired manner. The latching detent portion 86 is received within a recess or groove 88 in the spring retainer member 78, for locking the spring retainer against movement with respect to the operator housing 30. The detent 86 is electrically moved into and held in locking engagement within the recess 88 against the bias of a return spring 93 by a solenoid 90, which may directly control the detent 86 as illustrated in FIGURES 3 and 4 or may remotely control the detent 86 through suitable mechanical linkage. Upon deenergization of the solenoid 90, for example by automatic or manual switch control or by failure of the electrical energy source supplying the solenoid, the spring will withdraw the detent 86 from the recess 88, releasing the retainer 78 and allowing the spring 84 to force the retainer, drive shaft and the stem 56 to a predetermined safe position. Because of the splined connection between the drive sleeve 72 and the drive shaft 74, axial translation of the drive shaft relative to the drive sleeve will be allowed without disturbing the position of the drive sleeve. Deenergization of the solenoid latch 90 will occur selectively by opening of the electrical circuit controlling the solenoid, automatically responsive to predetermined unsafe conditions within the control system or inadvertently by failure of the electrical power controlling the solenoid latch.

Figure 5:
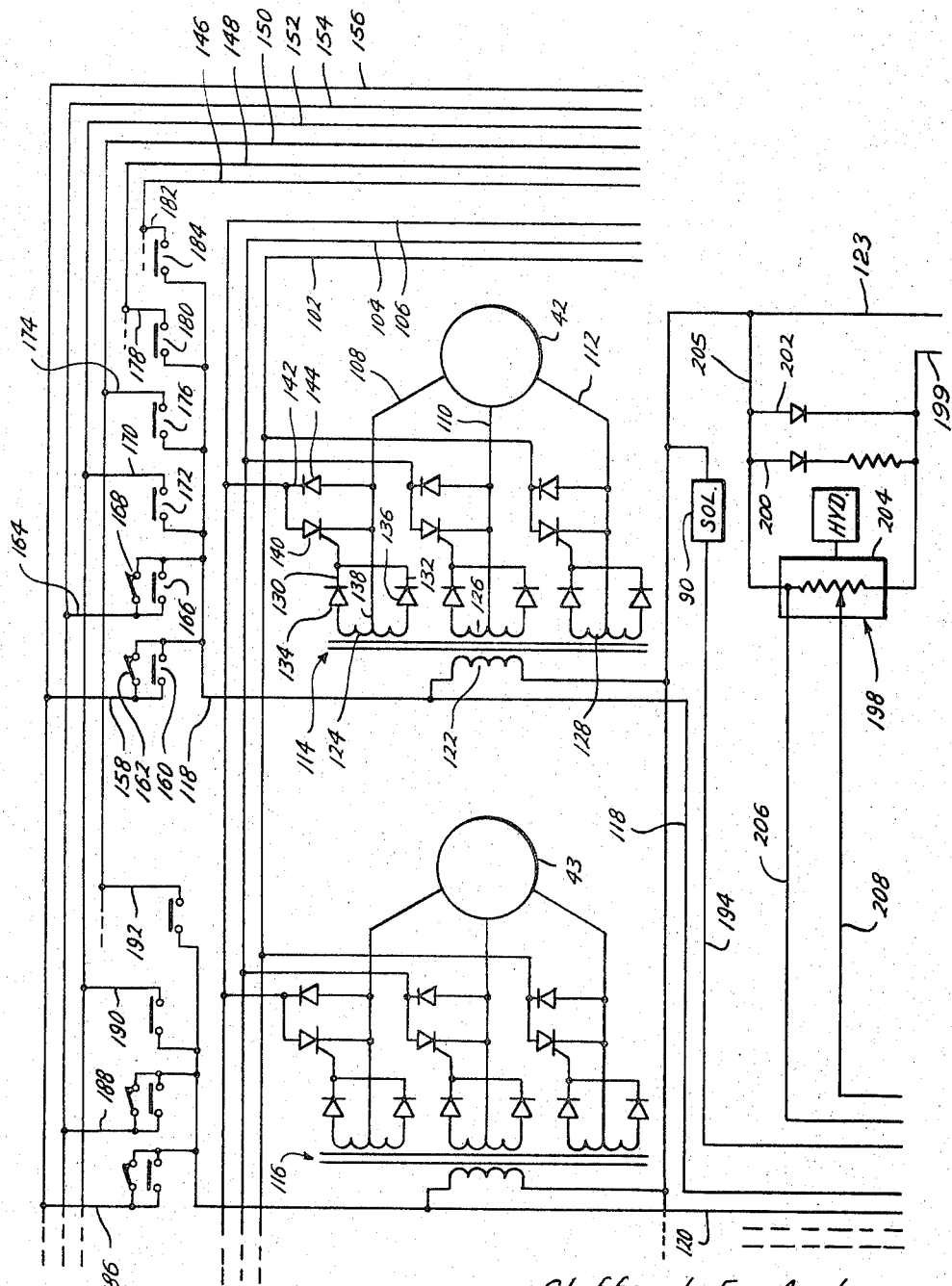
FIGURE 5 is a schematic view of electronic control circuitry for individual selective control of each of the power operator devices and electronic pressure transducer circuitry for transmitting hydraulic pressure conditions to the control point in the form of an electrical signal.

Referring now to FIGURE 5 for a detailed explanation of the control circuitry, a plurality of power conductors 102, 104, 106 are connected between a shore based control facility and the remotely located power operator devices to supply the power operator devices with electrical energy for operation thereof. The power conductors may be provided with three phase alternating current for driving the motors of the power operator devices. It is pointed out that the control system is adapted for control of any desired number of remotely located power operator devices, however, FIGURE 5 illustrates only two power operator motors and control circuitry therefor for purposes of smiplicity. For three phase operation, each of the power operator motors 42 and 43 is provided with three conductors 108, 110 and 112 for three phase operation thereof as illustrated in FIGURE 5. Three phase operation of the motors however, is intended merely as illustrative rather than limiting in regard to this invention since other types of electric motors may be used and controlled without departing from the spirit or scope of the instant invention. A pair of separately energized transformers 114 and 116 are provided for selective control of the electric motors 42 and 43 and are connected respectively to command conductors 118 and 120. The transformers 114 and 116 are selectively energized through the command conductors 118 and 120 responsive to the control circuitry at the control station as will be described in detail hereinbelow. For controlling operation of the motors 42 and 43, each lead of the motor is connected to individual electronic switching circuitry which causes selective energization of the motor circuit conductors 108, 110 and 112 as desired for operation of the motor. Since the electronic switching circuitry of each of the motors is substantially a duplication of the other, only the electronic circuitry associated with transformer 114 will be described in detail. The transformer 114 includes a primary winding 122 and three secondary windings 124, 126 and 128, respectively. With reference to the secondary winding 124 of the transformer 114, it is pointed out that a pair of leads 130 and 132, one at each end of the secondary winding 124, are provided with diodes 134 and 136. A center lead 138 of the secondary winding 124 is connected to the motor conductor 108. A controlled rectifier 140 having a gate circuit thereof connected to the lead 130 of the secondary winding 124 is connected between the central lead 138 of the secondary winding and the power conductor 106 through a conductor 142. A diode 144 in the conductor 142 and cooperates with the controlled rectifier to allow the introduction of electrical energy from the power conductor 106 to the conductor 108 of the motor 42. The controlled rectifier 140 allows passage of a half cycle of alternating current only when the gate thereof is energized by current passing through the conductor 130, and this occurs only when the transformer associated therewith is energized. The diode 144 is in opposite polarity with the controlled rectifier and is operative to allow passage of the other half cycle of alternating current. Only when the transformer is energized will the controlled rectifiers and diodes cooperate to conduct full cycle alternating current to the motor conductors. The electronic circuitry controlling the introduction of electrical energy from the power conductors 104 and 102 to the conductors 110 and 112 of the motor is identical with the electronic control circuitry described above in regard to the secondary winding 124 and, therefore is not described herein for the sake of simplicity.

For communication of electrical signals from the power operator devices to indicate the operating condition thereof, six signal busses 146, 148, 150, 152, 154 and 156, which signal busses are common to the operating circuitry of each of the power operator devices of the control system, are connected between the operating circuitry at the remote locations and the control circuitry of the system at the land based control station. As illustrated in FIGURE 5, a torque controlled circuit 158 is connected between the command conductor 118 and the torque stem extend signal buss 156. The circuit 158 includes a switch 160 which is controlled by the geared limit switch construction 70 as illustrated in FIGURE 2. Upon movement of the power operator device in the extend direction, the switch 160 will be in its open condition, thereby preventing energization of the circuit 158 therethrough. A torque switch 162 in the circuit 158 is normally biased to its closed condition and is adapted for movement to an open condition by the control stem 60 of the torque switch mechanism 58. As indicated above, the control stem 60 of the torque switch 58 is actuated by a control arm 62 which in turn is controlled by axial movement of the worm 52 as described above. During operation of the power operator device in the extend direction therefore, the switch 162 will be the controlling element in the circuit 158, thereby allowing energization of the circuit 158 only as long as the torque sensing mechanism allows the switch 162 to remain in its closed condition. Excessive torque encountered during the extend operation will cause the torque switch 162 to open deenergizing the signal circuit 156 and ultimately deenergizing the operator motor.

For controlling operation of the motor responsive to torque conditions in the retract direction, a retract signal circuit 164 is connected between the command conductor 118 and the torque stem retract signal buss 154. A switch 166 driven by the gear limit switch device 70 and a retract torque switch 168 are connected in parallel within the circuit 164. The switch 166 is in its open condition during the retract operation of the power operator device, thereby allowing energization of the circuit 164 to be solely controlled by the torque actuated switch 168 so that the signal induced into the signal buss 154 will indicate that the power operator device is operating under conditions of normal torque. An extend signal circuit 170 is connected between the command conductor 118 and the extend signal buss 152 allowing an electrical signal to be transmitted through the signal buss 162 to the control circuitry of the operating system to verify the condition of the power operator device. A switch 172 in the circuit 170 is controlled by the gear limit switch 70 resulting in a control of the energization of circuit 170 by the switch 172 in response to position of the gear limit switch. During operation of the power operator device in the extend direction, the switch 172 will be maintained in its closed condition by the gear limit switch 70, thereby causing the circuit 170 to remain in an energized condition and causing the signal buss 152 to remain energized. Upon reaching the fully extended condition of the power operator, the gear limit switch will open the switch 172 causing the circuit 170 and the signal buss 152 to become deenergized. A retract signal circuit 174 is controlled by a switch 176 to cause energization of the retract signal buss 150 in response to the position of the gear limit switch mechanism 70 of the power operator device. The switch 176 like the switch 172 is normally closed during operation of the power operator device both in the extend and in the retract directions and is opened by the gear limit switch 70 upon reaching the fully retracted position of the power operator.

A set signal conductor 178 is provided with a switch 180 for controlling the flow of electrical energy through the circuit 178 to the set signal buss 148. The set switch 180 is responsive to the position of the fail-safe mechanism of the power operator device under control devices such as position switches 79 and 81 for controlling energization of the circuit 178.

Whe the fail-safe mechanism of the power operator device is in the set condition as illustrated in FIGURE 3, the position switch 81 will cause the set switch 180 to be maintained in its open position, preventing the circuit 178 and the signal buss 148 from being energized. A fail-safe circuit 182 connected between the fail-safe signal buss 146 and the command conductor 118 is controlled by a switch 184 to control energization of the fail-safe buss 146. For example, when the power operator fail-safe mechanism is in the position illustrated in FIGURE 3, the fail-safe switch 184 will be in its closed condition and the fail-safe signal buss 146 will be energized. As the fail-safe mechanism begins to move from the FIGURE 3 to the FIGURE 4 position, the switch 180 will move to its closed condition, thereby energizing the set signal buss 148 through the circuit 178. Under this condition both the set and fail-safe signal busses 148 and 146 will be energized.

It is pointed out in regard to the motor 43 and the operating circuitry thereof, that signal circuitry to indicate the position of the motor 43 is substantially identical to the signal circuitry discussed above in regard to the motor 42 and the same will not be fully discussed for the sake of simplicity. For example, a torque extend signal circuit 186 is connected to the common torque stem extend signal buss 156 and is energized and controlled in the same manner as discussed above in regard to the torque extend circuit 158. A torque retract signal circuit 188 and light extend and light retract circuits 190 and 192 are energized in the same maner as discussed above in regard to circuits 164, 160 and 174, respectively, to indicate the condition of the power operator device associated with the motor 43. It is pointed out that the motor 43 is not provided with fail-safe or set signal initiation circuits as are indicated at 182 and 178 of the circuitry of the motor 42. This is to indicate that the control system will efficiently control groups of power operator devices, some of which are provided with fail-safe mechanisms as illustrated in FIGURE 4 and some of which may not require control by fail-safe mechanisms. As illustrated by dash lines in FIGURE 5, the common circuitry may be extended to control any desired number of electrically energized power operator devices, it being only necessary that a single command conductor be provided for each of the power operator devices for which the circuitry is designed.

For each power operator device which is provided with a fail-safe mechanism, a fail-safe hold circuit must be provided as illustrated at 194 in FIGURE 5. The fail-safe hold circuit 194 causes energization of the solenoid 90 as schematically illustrated in FIGURE 5 and illustrated in FIGURES 3 and 4. The solenoid 90 maintains the detent 86 of the solenoid latch within the groove 88 in the retainer 78 to maintain the retainer locked in the set condition of the fail-safe mechanism.

As illustrated generally at 198 in FIGURE 5, a pressure transducer mechanism is connected across a transducer power conductor 199 and a common or ground conductor 123. A pair of filtering circuits 200 and 202 are connected across the power conductor 199 and the common conductor through a conductor 204. An electrical strain gage device having a variable resistance circuit is operative responsive to hydraulic pressure, for example, such as may exist within a wellhead assembly to vary the resistance of the strain gage circuit in accordance with the variance in the hydraulic pressure. A pair of transducer load conductors 206 and 208 are connected to the strain gage device 204 and transmit the varying pressure in the form of an electrical signal to the control circuitry of the control system. The control circuitry will be responsive to the signal received from the pressure transducer mechanism 198 to cause the control system to automatically cause movement of the power operator mechanism to the fail-safe position in the event of either an excessively high or excessively low pressure condition.

Figure 6A:
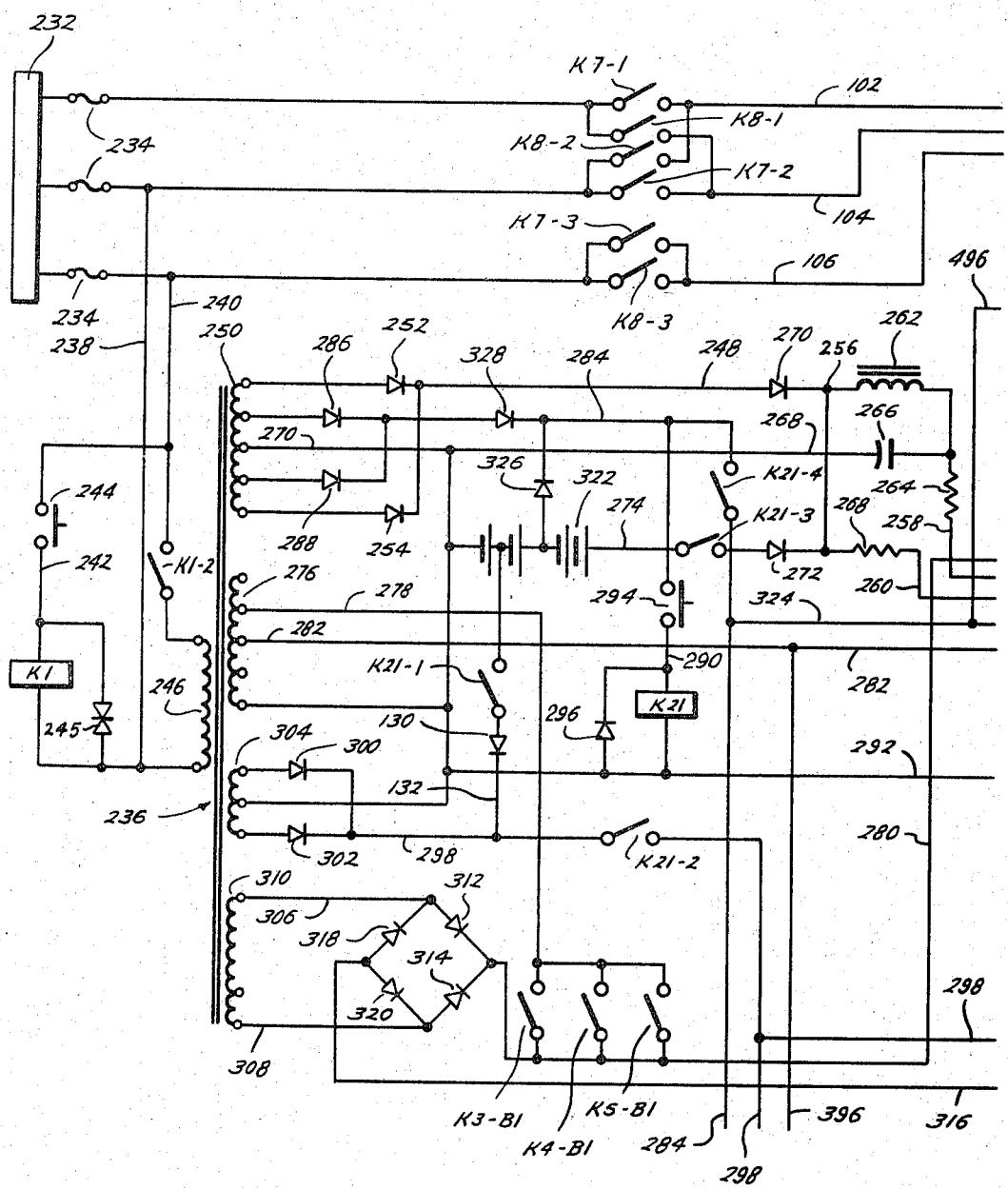

Referring now to FIGURE 6A for a detailed explanation of the control circuit, a plurality of power conductors 102, 104 and 106 are connected to a source 232 of electrical energy such as a 440 volt 3-phase alternating current input power. The power conductors are provided with fuses 234 for protecting the system from damage due to overload currents. A transformer illustrated generally at 236 has its leads 238 and 240 connected respectively to the power conductor 104 and the common power conductor 106. The transformer 236 is provided with a holding circuit which allows the transformer to be deenergized even though the power conductors are energized. The holding circuit 242 is provided with a contact K1-2 which is normally open in the deenergized state of the holding circuit and is closed by a relay K1 associated therewith to allow the holding circuit to become energized. A switch 244 is provided in the holding circuit 242 and is normally biased to its open position. Upon closing of the switch 244, the relay K1 will be energized through the holding circuit 242, thereby causing the contact K1-2 to move to its closed position to complete the transformer circuit through the leads 238 and 240 and the transformer primary winding 246. An arc arrester 245 is provided in the starting circuit to reduce arcing between the contacts of the circuitry to promote longevity of the circuit components.

The power circuitry including the power conductor 102, 104 and 106, the transformer 236 and various secondary circuits powered by the transformer 236 are generally known as the power pack circuitry of the control system.

The secondary winding 250 of the transformer 236 induces direct current into a DS power circuit 248 which provides power for the fail-safe hold circuit and transducer circuit as will be discussed in detail hereinbelow. For transposing the alternating current induced from the primary winding 246 of the transformer 236 to the secondary winding 250 of the transformer, a pair of diodes 252 and 254 are connected in parallel with the circuit 248. The diodes 252 and 254, which may be solid state components, as schematically illustrated, are both arranged to admit from the secondary winding 250 the same half-cycle of alternating current, thereby inducing a positive direct current into the circuit 248. While only one of the diodes 252 and 254 is required for transposing the alternating current from the winding 250 to the power circuit 248 as direct curent, the circuitry of the power pack control system utilizes two of these diodes for the sake of reliability of the system. For example, if one of the diodes 252 or 254 becomes inoperative, the other diode alone will maintain energization of the circuit 248. The direct current power circuit 248 divides at the connection 256 into a transducer power circuit 258 and a fail-safe hold power circuit 260. An inductor 262 and a resistor 264 are connected into the transducer power circuit 258 and cooperate for filtering effect with a capacitor 266, which is connected into a lead 268 interconnecting the transducer power circuit 258 with the common lead 270 of the secondary winding 250. The inductor 262, the resistor 264 and the capacitor 266 cooperate to introduce into the transducer power circuit 258 a filtered or smooth direct current of a character adaptable to operation of the transducer power devices which will be discussed in detail hereinbelow. A resistor 268 is disposed within the fail-safe hold circuit 260 to control the amount of electrical energy introduced into the fail-safe hold circuit. A pair of diodes 270 and 272 are disposed respectively in the DC power circuit 248 and in a battery power circuit 274 to prevent stray currents from being introduced into these conductors.

A secondary winding 276 of the transformer 236 is connected through conductor 278 to a command conductor 280, and will induce alternating current to energize the comand circuit 280. Three contacts K3-B1, K4-B1 and K5-B1 are connected in parallel between the conductor 278 and the command conductor 280. These contacts are normally open in the unenergized condition of the control circuitry and will be closed individually by the control circuitry as will be described hereinbelow to cause energization of the command conductor 280 by alternating current. The secondary winding 276 of the transformer 236 is also conected through the conductor 278 to a control circuit power conductor 282 which supplies the control package portion of the control system with alternating current for operation thereof.

To facilitate an understanding of the circuitry of the control system, contacts which are opened and closed by relays are identified by a relay prefix designation. For example, a relay K21 is provided with contacts for control of various portions of the control circuitry. These contacts are identified by the relay prefix followed by the contact designation. The K21 relay therefore will control contacts K21-1, K21-2, etc.

A direct current energized maintenance circuit 284 is connected to the secondary winding 250 of the transformer 236 through parallel connected diodes 286 and 288 and will supply direct current for example, 24 volt direct current to the maintenance circuit of the control system. A normally open contact K21-4 is disposed within the conductor 284 and is closed responsive to energization of the relay K21 for energizing the conductor 284. The direct current power relay K-21 is disposed within a conductor 290 which interconnects the conductor 284 with a common conductor 292. A direct current power switch 294 is connected within the conductor 290 and is closed to energize the circuit 290 and the relay K21. A diode 296 is connected between the common conductor 292 and the direct current conductor 290 and prevents the introduction of stray currents into the direct current system and reduces arcing in relay K21 when switch 294 is opened.

A direct current visual signal supply conductor 298 is connected through a pair of parallel connected diodes 300 and 302 to a secondary winding 304 of the transformer 236. A normally open contact K21-2 is controlled by energization of the relay K21 for allowing the flow of direct current through the conductor 298. The direct current flowing through the conductor 298 may be in the order of 5 volts direct current, for example, for controlling the energization of visual indicator signal devices within the control circuitry.

A positive-negative full wave rectifier direct current supply source including a pair of conductors 306 and 308 is connected to a secondary winding 310 of the transformer 236. The command circuit 280 is connected through a pair of diodes 312 and 314 to the conductors 306 and 308, respectively. The diodes 312 and 314 are so arranged that a positive half-cycle of alternating current in the conductor 306 will pass through the diode 312 into the command conductor 280 and a positive half-cycle induced by the transformer into the conductor 308 will flow through the diode 314 into the command conductor 280. A signal power conductor 316 is connected through a diode 318 to the conductor 306 and is connected through a diode 320 to the conductor 308. The diode 318 is arranged within the circuitry to admit the negative half-cycle of the alternating current while preventing the flow of the positive half-cycle therethrough.

The diode 320 is arranged within the circuitry to admit the negative half-cycle of alternating current from the conductor 308 while preventing the flow of the positive half-cycle therethrough. The signal power conductor 316 therefore receives the negative half-cycle of alternating current from both of the conductors 306 and 308.

For maintenance of the system in a status quo operating condition in the event of failure of the primary power source 232, a battery 322 is connected in the battery power circuit 274 and is operative to maintain the transducer power conductor 258, the fail-safe hold conductor 260, the visual signal supply conductor 298 and a high-low control power conductor 324 in an energized condition for a limited period of time. A contact K21-3 in the battery powered conductor 274 is controlled by the relay K21 to allow the flow of current from the battery 322 through the conductor 274. A pair of diodes 326 and 328 prevent the flow of stray current through the conductor 284 from reaching the battery 322 or the secondary winding 250 of the transformer 236.

The potential of the battery 322 will be slightly lower than the electrical potential normally introduced into the conductor 284 by the secondary winding 250 of the transformer and therefore while the primary power source 232 is energizing the transformer 236 through the secondary windings 250 and 304, there will be no flow of current from the battery into either of the direct current systems. The battery therefor will be maintained in its full power condition at all times and will merely be maintained in an idle condition within the circuitry. If, however, the primary power source should fail and the transformer 236 should be deenergized, the battery will immediately take over and maintain the direct current systems in an energized condition for a period of time equal to the battery life. If more battery maintenance times is required, other batteries can be provided or a portable generator will effectively sustain the system in its status quo condition until primary electrical power can be restored.

The control package of the control system includes an extend power circuit 340 which is connected between the control circuit power conductor 282 and a common ground conductor 342. In operation the extend power circuit 340 selects electrical current of a desired phase sequence in the power conductors 102, 104 and 106 for operation of the remotely located power operator motor in a preselected direction. The circuit 340 includes a pair of contacts K3-B2 and K4-B2 which are connected in parallel within the circuit 340. At least one of these contacts must be closed for the circuit 340 to become energized. The normally closed switches K3-B2 and K4-B2 are safety switches, which will prevent the circuit 340 from becoming energized until the extend and set initiation circuits of the control system are in a predetermined condition as will be described in detail hereinbelow. The extend power circuit 340 is provided with a relay K7, which is energized upon energization of the circuit 340. A retract power circuit 344 is connected between the control circuit power conductor 282 and the common ground conductor 342 and is operative, when energized, to select alternating current of the opposite phase sequence in the power conductors 102, 104 and 106. A contact K5-B2, which is normally open in the unenergized condition of its associated relay K5B, is responsive to the retract initiation circuit of the control system to prevent energization of the circuit 344 except when the retract initiation circuit is energized. A relay K8 connected in the retract power circuit 344 is operative upon energization of the retract power circuit. The phase sequence selection circuits 340 and 344 are both provided with safety interlock contacts K8-4 and K7-4, respectively. These contacts are normally closed in the unenergized condition of the respective circuits and the safety interlock contact in one of the circuits is opened by the associated relay of the other of the circuits to prevent simultaneous operation of both of the circuits. For example, if it is desired to energize the extend power circuit 340, the relay K7 upon becoming energized will cause the safety interlock contact K7-4 of the retract power circuit to become open, thereby preventing energization of the retract power circuit while the extend power circuit 340 is energized. The extend and retract power circuits 340 and 344 are each provided with a sparked arrester 346 and 348, respectively, which prevent arcing upon opening and closing of the contacts of the circuit to insure the reliability and longevity of the circuits. A pair of contacts K7-5 and K8-5 are disposed in the sequence initiation power circuit 282. These contacts are normally closed in the deenergized condition of the associated relay and are operative upon energization of either of the power relays K7 or K8 to deenergize the sequence initiation circuits to prevent simultaneous energization of more than one operational sequence.

Assuming it is desired to cause the motor of the selected power operator to operate in the extend direction, the extend power circuit 340 assuming that the associated contacts are properly oriented will become energized, thereby energizing the relay K7. In the power conductors 102, 104 and 106 are disposed a series of contacts respectively K7-1, K7-2 and K7-3, which are normally open in the unenergized condition of the extend power circuit 340, thereby preventing energization of the power conductors. The contacts K7-1, K7-2 and K7-3 are closed by the relay K7 upon energization thereof. It is desired to operate the motor of the power operator devices in a retract direction, the retract power circuit 344 is energized, thereby energizing the relay K8. The relay K8 causes contact K8-1, K8-2 and K8-3 in the power conductors 102, 104, and 106 to become closed, thereby energizing the power conductors and causing operation of the motor of the power operator by alternating current of a predetermined phase sequence. It is seen, therefore, that energization of the power conductor by the extend and retract power circuits 340 and 344 as described above causes forward and reverse operation of the reversible power operator motor to selectively extend or retract the valve or other mechanical device with which the power operator is associated.

For inducing movement to the motor of the power operator system, the control package of the operator control system includes initiation circuits for selecting and actuating the desired direction of motor movement. The various initiation circuits selectively control energization of the power circuits 340 and 344 depending upon the desired direction of motor rotation. For example, to cause the power operators to move in a retract direction, a retract initiation circuit 350 illustrated in FIGURE 6C is connected between the power conductor 282 and the common conductor 342. A starting circuit 354 is provided for the initiation circuit and is connected between the power conductor 282 and the retract initiation circuit 350. A switch 356 is disposed within the circuit 354 to control energization of the retract initiation circuit 350. The switch 356 is manually closed by personnel at the control station to energize the circuit 350. A pair of contacts K10–1 and K12–2 are provided in the retract initiation circuit 350 and are closed responsive to energization of signal relays K10 and K12 to allow completion of the circuit 350. The retract initiation circuit therefore can be energized only when the power operator motor is in a position causing the gear limit switch mechanism thereof to close the operator position indicator switches 166 and 176.

To prevent improper electrical signals from being introduced by the control circuitry to the operating circuitry of the remotely located power operator, six signal busses extend from the operating circuitry of the power operator device and represent the six operating conditions of the power operator. Signal energized relays K9, K10, K11, K13 and K14 are connected within each of the respective signal busses and are energized by a flow of electrical energy through the power operator circuit, the respective signal buss and a common signal power conductor 316. Each of the relays in the singal buss circuits when energized will maintain the associated contacts in the control circuitry in a predetermined closed or opened position depending upon the type of control desired. For example, when the relay K10 is energized by current flowing through the torque stem retracting signal buss 154, the contact K10–1 in the retract initiation circuit 350 will be closed, thereby allowing the retract initiation circuitry to be energized upon closing of the switch 356.

A retract control relay K5A in the retract initiation circuit 350 is energized upon closing the switch 356 of the starting circuit 354. A contact K5–A3 is closed responsive to energization of the relay K5A, thereby allowing the retract circuit 350 to be energized through a power conductor 358 and a conductor 360 in connection with the control circuit power conductor 282. Upon energization of the relay K5A and closing of the contact K5–A3, the normally open control switch 356 may be released by the personnel so that it may be biased to its open condition. The retract circuit 350, therefore, will remain energized through the conductors 358 and 360. The relay K5A of the retract initiation circuit 350 includes a contact K5–A2 in a stop initiation circuit 362. The contact K5–A2 is normally open in the unenergized condition of the relay K5A, thereby preventing the stop actuation sequence from being initiated through that portion of the stop initiation circuit in which the contact K5–A2 is located. The stop initiation circuit 362 is connected between the power conductor 358 and the common conductor 342 by three parallel leads including contacts K3–A2, K4–A2 and K5–A2. These contacts are actuated, respectively, by relays K3A, K4A and K5A and effectively control energization of the stop initiation 352 responsive to specific conditions existing in the control circuitry at the particular time involved. A double stop switch 364 is disposed in the stop initiation circuit 362 which, in operating condition of the control circuitry, will control energization of a holding relay section K2B. The holding relay incorporating the relay sections K2A and K2B is an unbiased relay and the sections thereof will remain in the energized position even though they may become subsequently deenergized. Energization of one of the relay sections, K2A for example, causes the other section, K2B for example, to move to its deenergized condition. This prevents simultaneous energization of both sections of the stop initiation circuit at any one time. Each of the two sections K2A and K2B of the stop initiation circuit is provided with an arc arrester device 370 and 372 respectively to insure longevity of the contacts within the circuit. The stop switch 364 is operative in its other position to cause energization of a conductor 366, forming a second separately energized part of the stop initiation circuit 362, thereby energizing the opposing holding relay section K2A. The relay section K2A, upon becoming energized is operative to move a contact K2–A2 in the conductor 358 from its normally closed condition to an open condition, thereby deenergizing that portion of the power circuit 358 controlling the setting, extending and retracting operations of the control circuitry. In addition, relay K2A, upon becoming energized causes closing of the contact K2–A1 in an operational sequence indication circuit 368. The circuit 368 is provided with six visual indicator circuits, each of which are energized responsive to initiation of various circuits of the control system to give a visual indication that the selected portion of the control system has commenced the desired operation. For purpose of illustration, as shown in FIGURE 6C, each of the illumination circuits comprises a pair of indicating lights for each of the six individual circuits of the operational sequence indication circuit 368. While one visual indicator light would be deemed sufficient to indicate the operation sequence of the related portion of the control circuitry, it is nevertheless deemed prudent to incorporate two visual indicator lights in each of the circuits for the sake of safety. Should one of the visual indicator lights become inoperative, the other light being connected in parallel therewith will be illuminated to show that the operational sequence has commenced. It is quite improbable that both of the signal indicator lights will become inoperative at any one time, and therefore a failure of both of the visual indicator lights to become illuminated upon energization of the specific related portion of the control circuitry had become inoperative indicating that repair of the same is in order.

The retract initiation circuit 350 also includes a relay K5B connected in parallel with the relay K5A and which upon becoming energized through the circuit 350 causes closing of the contact K5B2 of the retract power circuit 344 and also causes closing of the contact K5–B1 which controls the flow of electrical energy in the command circuit 280. An arc arrester 374 is provided for the retract initiation circuit 350 to reduce arcing of the contacts therein as the circuitry is energized and deenergized.

For controlling operation of the power operator mechanism in an extend direction, an extend initiation circuit 376 is connected between the power conductors 282 or 358 and the common conductor 342.

The extend initiation circuit 376 includes a relay K4B connected in parallel and simultaneously energized with the relay K4A. The relay K4B is operative when energized to cause closing of a contact K4–B2 in the extend power circuit 340 and a contact K4–B1, which when closed allows the flow of electrical energy from the conductor 278 to the command conductor 280. Therefore, when the relay K4B is energized, alternating electrical current is allowed to flow through the command conductor 280 to energize the selective command buss of the specific power operator desired for operation. At the same time, the relay K7 of the extend power circuit 340 is energized by closing of the contact K4B2 and causes closing of its associated relays K7–1, K7–2 and K7–3 in the power conductors 102, 104 and 106, respectively, whereby alternating current of the desired phase sequence is selected and is introduced into the common motor busses extending to the power operator devices.

The circuit 376 also includes a contact K4–A3 which is associated with the relay K4A and which is closed upon energization of the relay K4A to hold the circuit 376 in an energized condition. A conductor 378 connected between the power conductor 282 and the extend initiation circuit 376 is provided with a normally open biased switch 380 for initially energizing the circuit 376.

A pair of contacts K9–2 and K11–3 in the extend initiation circuit 376 are responsive respectively to energization of the signal initiated relays K9 and K11 for controlling energization of the circuit 376. The contacts K9–2 and K11–3 are normally open in the unenergized condition of the associated command initiated relays K9 and K11. An arc arrester 382 is provided for the circuit 376 to reduce wear of the contacts associated with the circuit. The relay K4A, when energized will move the contact K4–A1 in the operational sequence indication circuit 368 from its normally open condition to its closed condition, to allow energization of the extend signal indicator circuit 384, illuminating the indicator lights and giving visual indication that the extend initiation circuit 376 has been properly energized and is functioning.

The control package of the control system (FIGURE 6C) includes a set initiation circuit 384, which is initially energized through a conductor 282 under control of a manually operated set switch 388. A pair of set relays K3A and K3B are connected in parallel to the set initiation circuit 384 and are initially energized responsive to closing of the set switch 388, which allows alternating electrical energy to flow from the control circuit power conductor 282 through the circuit 384 to the common conductor 342. A contact K3–A3 in the circuit 384 is closed upon energization of the relay K3A and allows the cirruit 384 to remain energized upon opening of the biased set switch 388. A conductor K9–1 in the set initiation circuit 384 is closed in the energized condition of its associated relay K9 in the torque stem extending signal buss 156. The set initiation circuit 384 can therefore be energized only when the relay K9 closes the contact K9–1. The relay K3B in the set initiation circuit 384, upon becoming energized, closes the normally open contact K3B1 in the command conductor 278 (FIGURE 6A) to allow the flow of alternating current from the conductor 278 to the command conductor 280, thereby causing the flow of electrical energy in the command conductor 280 when the set initiation circuit 384 is energized. The relay K3–B also causes closing of the normally open contact K3–B2 in the extend power circuit 340. As indicated above, the circuit 340, upon becoming energized, causes energization of the relay K7, which causes the contacts K7–1, K7–2 and K7–3 associated therewith to close to select a predetermined phase sequence within the motor buss power conductors 102, 104 and 106. A spark arrester 390 is provided in the circuit 384 to prevent arcing between the contacts within the circuit as the contacts are opened and closed.

A set delay circuit 392, which is powered from a direct current power conductor 324, is operative to cause the motor of the power operator device to operate a short time after reaching the maximum extended position as determined by the gear limit switch associated therewith. This allows positioning of the groove 88 in the spring retainer 78 of the power operator slightly beyond its normal maximum extended position and thereby allows the detent 86 to easily move fully into the groove 88. As illustrated in FIGURE 4, the fail-safe mechanism is in the set position being in the order of a few thousandths of an inch beyond the normal maximum extended position.

The set delay circuit 392 includes a relay K6, which upon being energized and after a short delay of one or two seconds causes opening of a contact K6–1 in the set initiation circuit 384 thereby deenergizing the same. A contact K11–2 in the circuit 392 is moved to its open position from a normally closed position by the relay K11 in the stem extending signal circuit 152 upon energization thereof. A contact K3–B3 is closed responsive to energization of a relay K3B in the said initiation circuit 384. A diode 394 connected across the common conductor 342 and the direct current conductor 392 effectively eliminates the introduction of alternating current into the direct current circuit 324.

Figure 6B:
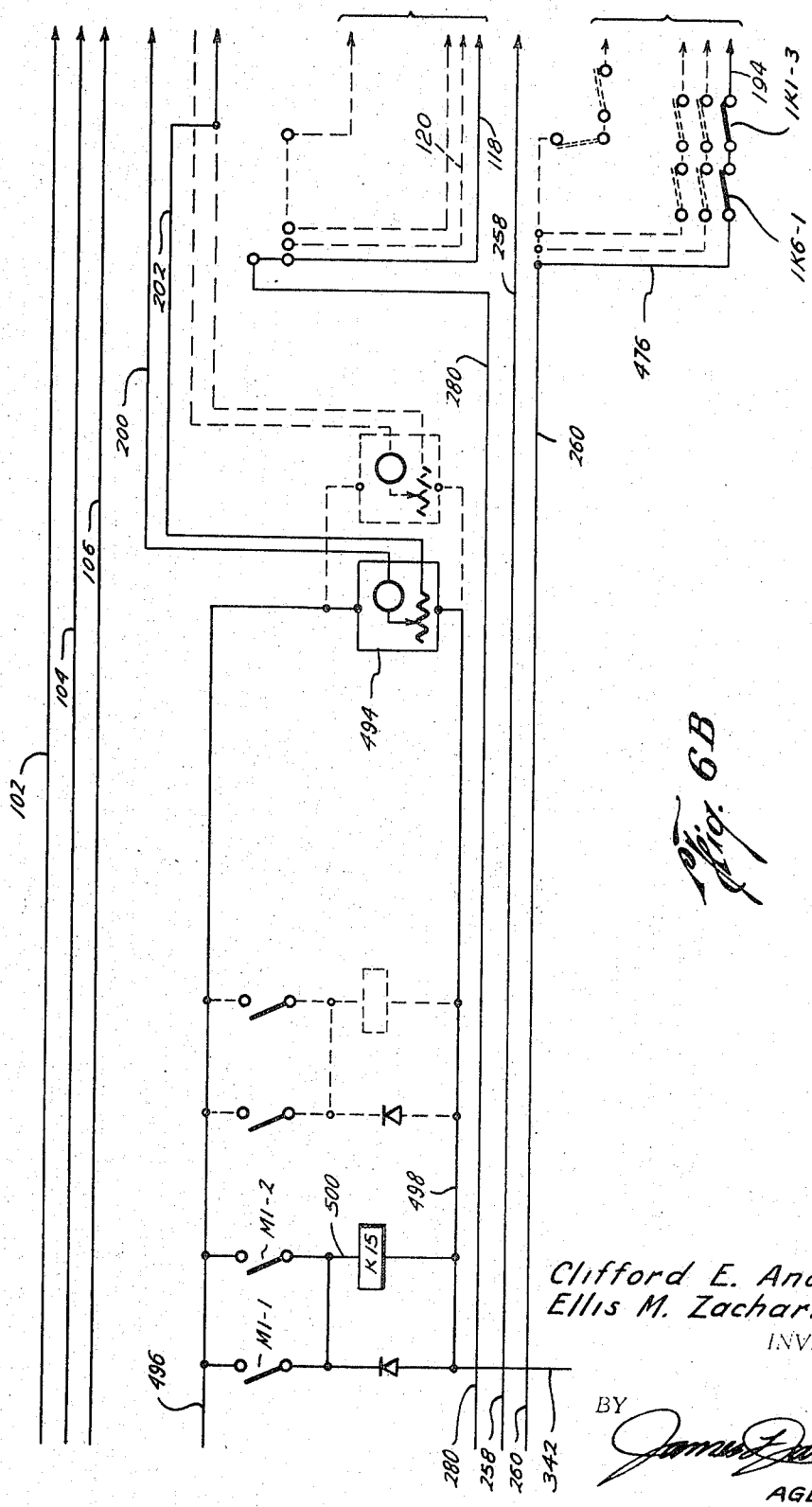
Figure 6E:
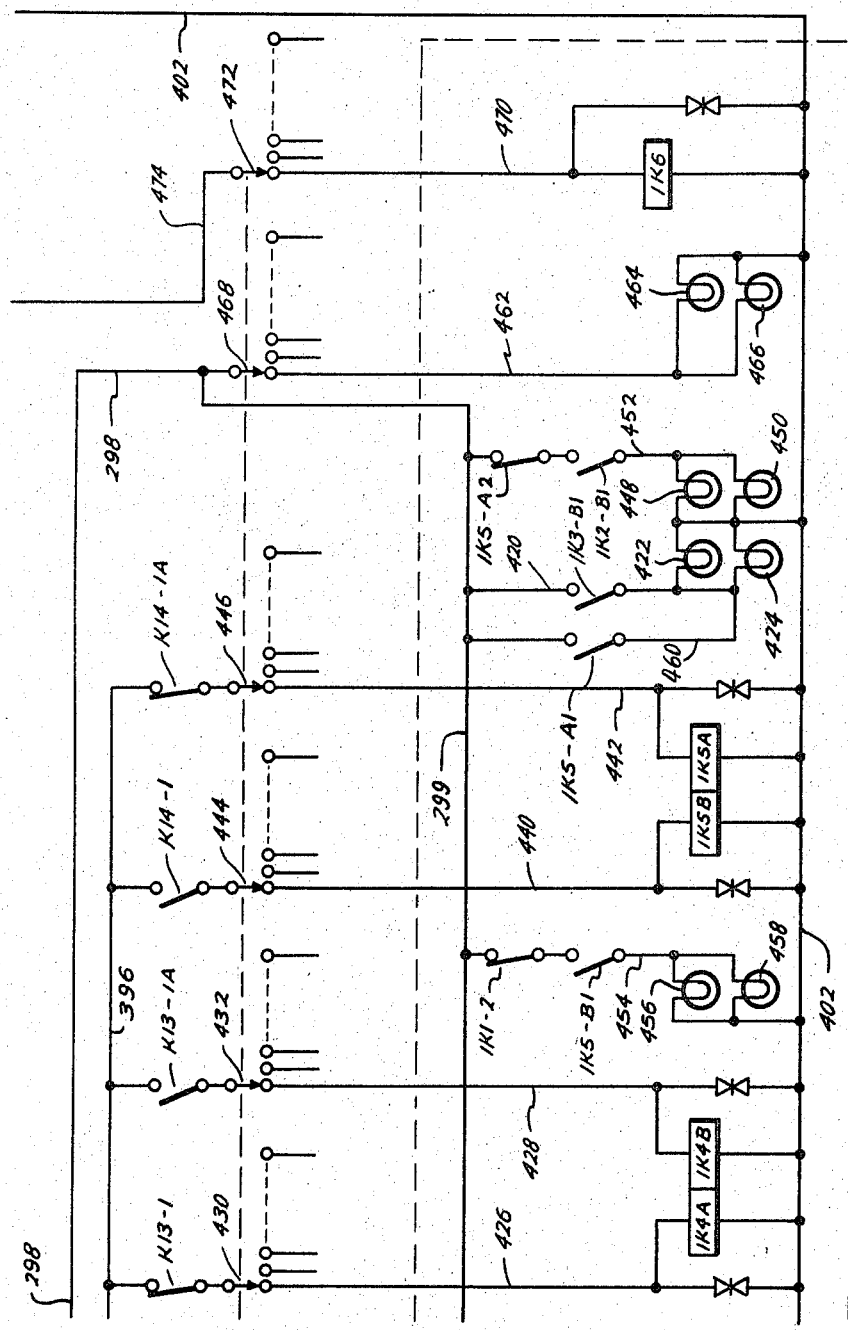

Referring now to FIGURES 6D and 6E, it is pointed out that the control circuitry of the control system includes certain duplicated individual circuitry for each of the remotely located power operators which are controlled by the system. For the purpose of simplicity only one of the circuits for an individual valve operator is illustrated and described, it being obvious from the description that other similar circuits for individual control of other power operators may be connected to the common control circuitry. Connection between the individual control circuitry and the common control circuitry of the system is achieved by means of a selector switch generally referred to as a gang switch represented by arrows. As illustrated by dash lines in FIGURES 6D and 6E, it is apparent that the circuitry of the common control portion of the control system may be switched between the individual circuitry of a number of power operators. The selector switch may be manually, mechanically or electrically moved between the various desired positions as determined by the operator at the control station. A common power conductor 396 is connected to the control circuit power conductor 282 to provide operating power for various portions of the individual control circuitry of the power operator devices. A contact 398 of the gang switch is connected through a normally closed contact K11–1 to the power conductor 396. A position indicator light circuit 400 is connected through the gang switch contact 398 to the power conductor 396. A relay section 1K–2A of a holding relay in the circuit 400 is connected to a common conductor 402 and is actuated upon energization of the conductor 400. A relay 1K–2B forming the other section of the holding relay is connected to a conductor 404, energization of which is controlled by a contact 406 of the gang switch under further control of a normally open contact K11–1A. The normally closed contact K11–1 and the normally open contact K11–1A are both controlled responsive to energization of the stem extend signal relay K11. When the relay K11 is energized, the normally open contact K11–1A is closed, thereby energizing the conductor 404 to move the relay 1K–2B to its energized position. The contact K11–1, being normally closed is, upon energization of the relay K11, moved to its open position to deenergize the circuit 400 and the relay 1K–2A. The holding relay represented by the relays 1K–2A and 1K–2B will change positions only when the opposing relay is energized. For example, if the relay 1K–2A is energized, and subsequently becomes deenergized without energization of the relay 1K–2B, the circuit breaker device of the relay will remain in its previously energized position. Therefore, upon deenergization of the relay 1K–2A without subsequent energization of the relay 1K–2B, the contact 1K2–A1 will remain in its open condition. The circuits 400 and 404 are respectively provided with arc arrester devices 408 and 410, respectively, to prevent unnecessary wear on the contacts within the respective circuits. The relay 1K–2B, when energized, closes a contact 1K2–B1 in a visual indicator circuit.

A pair of circuits 412 and 414 are provided for control of position indicator light and are provided with a holding relay including relay sections 1K-3B and 1K-3A, respectively. The circuits 412 and 414 are connected through contact sections 416 and 418, respectively, to the power conductor 396. A contact K12-1, which is normally open and K12-1A, a normally closed contact, are provided for controlling energization of the conductors 412 and 414, respectively, responsive to energization of the relay K12 of the stem retract signal buss 150. When the stem retract relay K12 is energized, the contact K12-1 is closed to energize the conductor 412 and the relay 1K-3B. The relay 1K-3B, upon becoming energized, causes the contact 1K3-B1 to become closed thereby energizing a position indicator circuit 420. A pair of signal indicator lights 422 and 424 are connected in parallel between the circuit 420 and the common conductor 402 and are simultaneously energized upon energization of the circuit 420. For controlling the position of the indicator light during resetting of the fail-safe mechanism, a pair of circuits 426 and 428 are connected through contacts 430 and 432 of the gang switch to the power conductor 396. A holding relay having relay sections 1K-4A and 1K-4B are connected between the common conductor 402 and the respective signal light control conductors 426 and 428. A normally closed relay K13-1 is moved to its open condition responsive to energization of the associated relay K13 in the set signal buss 148 to cause energization of the conductor 426 and the associated relay 1K-4A. When the set relay K13 is energized by current flowing through the set signal buss 148, the normally opened relay K13-1A will be moved from its normally open to its closed condition causing energization of the conductor 428 and the relay 1K-4B. The relay 1K-4B, when energized, closes the contract 1K4-B1 in a fail-safe signal indicator circuit 434, thereby energizing the same. A pair of visual indicator lights 436 and 438 are connected in parallel between the conductor 434 and the common conductor 402 so that both of the lights are energized when the signal circuit 434 is energized. A pair of signal control conductors 440 and 442, the energization of which is controlled by a normally open contact K14-1 and a normally closed contact K14-1A, respectively, are connected respectively through gang switch contacts 444 and 446 to the power conductor 396. A holding relay having sections 1K-5B and 1K-5A is provided for controlling illumination of position indicator lights in the signal indicator circuits 420 and 452. Upon energization of the relay K14 of the fail-safe signal buss 146, the normally opened contact K14-1 associated therewith will cause energization of the conductor 440, thereby moving the relay section 1K-5B to its energized position. The relay 1K-5B, when energized, causes closing of the contact 1K5-B1 in a set position indicator circuit 454. The set position indicator circuit 454 includes a pair of parallel connected signal indicator lights 456 and 458, which are illuminated upon energization of the circuit 454. When the circuit 442 is energized, the holding relay section 1K-5A is also energized closing the normally open relay 1K5-A1, thereby allowing the flow of direct current from the visual signal supply 298 through the signal lights 422 and 424 to the common conductor 402 to illuminate the visual signal lights. Simultaneously the relay 1K-5A will open the normally closed contact 1K5-A2 in the conductor 452 deenergizing the lights 448 and 450. A relay 1K5-A1 is moved from its normally closed position to an open position, upon energization of its associated relay 1K-5A, thereby causing deenergization of the conductor 452, causing the signal indicator lights 448 and 450 to go off. When the extended signal indicator lights 448 and 450 turn off, an effective indication is given that the power operator device has reached its full retracted position by virtue of the illuminated signal indicator lights 422 and 424.

An operate indication circuit 462, having a pair of visual indicator lights 464 and 466 connected in parallel therewith is connected to the direct current power source 298 through a gang switch contact 468. The signal lights 464 and 456 are illuminated responsive to closing of the DC power contact K21-2 to indicate that direct current is being supplied through the conductor 298 to the various direct current control portions of the individual control circuitry. A fail-safe control circuit 470 is connected through a gang switch contact 472 and through a conductor 474 to the said initiation circuit 384. The fail-safe hold control circuit 470 includes a relay 1K6, which is energized to move a normally closed contact 1K6-1 in the fail-safe hold conductor 476 to its opened condition in the event deenergization of the fail-safe hold conductor 476 is desired. The conductor 476 is connected to the fail-safe hold power conductor 260 for constant energization from the DC power source conductor 248 or from the battery power circuit 274. The fail-safe hold conductor 260 will remain energized through the battery power circuit 274 in the event of failure of the primary power source 232. In case of failure of the primary power source 232, the individual visual indicator portions of the individual power operator circuitry will remain energized by virtue of being connected to the direct current power supply 298. Upon failure of the power source 232, therefore, the signal indicator lights will remain energized to indicate the position of each of the power operator devices as determined by the position thereof when last operated. The personnel at the control station therefor will have a visual indication of the condition of each of the power operators controlled by the system even upon failure of the primary source of electrical power.

As illustrated in FIGURE 6B, the control system includes a safety circuit which is responsive to predetermined high or predetermined low hydraulic pressures as the power operator system for causing the control system to automatically move the power operator device to a predetermined safe position. For example, if the power operator device is provided for control of a valve or valves of a wellhead assembly, the fluid pressure within the wellhead assembly will be transmitted to the control system in the form of an electrical signal. If the fluid pressure within the wellhead becomes too low or too high as determined by preselected pressure conditions, a high or low power module of the control system will become energized and will cause actuation of the fail-safe command circuitry of the control system to cause the power operator device to move to a predetermined safe condition. If the control system is employed for the control of valve operator mechanisms having fail-safe construction incorporated therein as illustrated in FIGURES 3 and 4, the high-low power module upon becoming energized will be effective to cause deenergization of the fail-safe hold circuit, thereby resulting in deenergization of the solenoid latch mechanism allowing the same to release the retainer member 78 and allowing the spring 84 to move the retainer and valve stem structure to a safe position.

With reference to FIGURE 6D, the control system is provided with a fail-safe control circuit 478, which is connected to the direct current maintenance circuit 284 for its energization and is provided with a normally open manually operated switch 480 for controlling energization of the circuit 478. A contact 1K2-A1 in the circuit 478 is normally closed in the deenergized position of its associated relay 1K-2A in the extend position indicator circuit 400. A relay 1K1 in the fail-safe hold control circuit 478, which is normally energized through the normally open switch 480 and normally closed contact 1K2-A1, maintains contacts 1K1-1 in a holding circuit 482 in an energized condition to form a bypass around the normally opened switch 480. A visual indicator circuit 484 is connected to the bypass conductor 482 and to the common conductor 402 and includes a pair of parallel connected visual indicators 486 and 490, which are energized upon closing of the contact 1K1-1, to indicate that the fail-safe command has been initiated. A normally open contact 1K1-2 is closed upon energization of the relay 1K1 to cause illumination of the visual indicators 436 and 438 in the circuit 434, for giving a visual indication that the power operator device has been moved to its fail-safe condition. At the same time, a normally closed contact 1K1-3 in the fail-safe hold conductor 476 will be moved from its normally closed position by the relay 1K1 upon energization thereof to cause deenergization of the fail-safe hold conductor 476, thereby causing the solenoid latch 90 of the power operator device to become deenergized. A direct current arc arrester 492 is provided for the fail-safe hold control circuit 478 to prevent undue wear or corrosion of the contact point as the same are opened and closed during operation of the circuitry.

The high-low automatic control portion of the control circuitry includes a signal pickup module 494 for each of the devices for which pressure control is desired. For example, in a wellhead assembly having four valves generally one or more of these valves is provided with a fail-safe control mechanism. The wellhead assembly may be provided with a single pressure transducer for relaying the wellhead pressure to the control system. It is probable therefore that for each group of valves controlled by the system, there will be provided a single pressure transducer device which controls automatic movement of a single fail-safe mechanism in one of the valves of the group to move the same to its safe condition responsive to the excessively low or excessively high pressures within the wellhead. The high-low pressure pickup module 494 is powered from a power conductor 496 connected to the power supply conductor 324.

With reference to FIGURE 6B, the pressure pickup 494 is connected to a common conductor 498 for completion of the circuitry. A high-low initiation circuit 500 is connected between the power conductor 496 and the common conductor 498 and includes a pair of contacts M1-1 and M1-2, which are responsive respectively to high and low pressures which are introduced through the high-low pickup module 494 to move them from their normally open to a closed position. The high-low pickup module 494, upon receiving electrical signals indicating either predetermined high or predetermined low pressure conditions, such as, for example, may be relayed from the pressure transducer 198 in FIGURE 5 is operative to close either of the contacts M1-1 or M1-2 to energize the high-low initiation module 500. A relay K-50 in the high-low initiation circuit 500 upon becoming energized by closing of either of the contacts M1-1 or M1-2 will cause closing of the relay K15-1 in the high-low automatic circuit 502. The circuit 502 is provided with a two position switch 504, which controls energization of the circuit 502. For example, if it is desired to eliminate the automatic control of the remotely located valve operators in response to high and low pressure conditions, the switch 504 may be moved to its off position, and in this position the contacts K15-1, upon being closed by the relay K15 will not be effective to cause the relay 1K1 to become energized. For an indication of the condition of the high-low automatic control circuity, a pair of indicator circuits 506 and 508 are connected across the DC power conductor 298 and the common ground 402, and are controlled responsive to the position of the switch 504. When the high-low control is in the off position, the circuit 506 will become energized, thereby illuminating a pair of visual indicator lights 510 and 512, and if the high-low control is set in the atuomatic position, visual indicator lights 514 and 516 will be energized through the circuit 508. As illustrated by dash lines in the circuitry in FIGURE 6B, other high-low initiation modules, each having its own pickup module indicated also in dash lines, may be provided for control of other power operator devices.

Assuming the power operator structure to be in its fully extended condition as illustrated in FIGURE 3, the control circuitry of the control system will be in the following condition: The retract initiation circuit 350 (FIGURE 6C) will be deenergized and the switches K10-1 and K12-2 will be in their closed condition responsive to energization of their respective relays K10 and K12. The contact K5-A3 and the retract initiation switch 356 will be in their normally open condition. To initiate the retract operation, it is only necessary to close the manually operated switch 356. The retract initiation circuit 350 in this condition, therefore, is in readiness for energization. The extend initaition circuit 376 in the fully extended condition of the power operator will be deenergized because the contact K11-3 thereof will be opened by its respective relay K11. The relay K11 is deenergized upon completition of the extend operation by the gear limit switch 172 of the motor circuit. Upon reaching its fully extended condition, the gear limit switch of the power operator construction opens the switches 160, 172 and 180, thereby deenergizing the signal busses 152 and 148. The signal buss 156 will remain energized through the torque switch 162 to maintain the signal bus 156 and its associated relay K9 in an energized condition. It is seen therefore that in the fully extended condition of a power operator constructor, the relays K9, K10, K12 and K14 will be energized and the relays K11 and K13 will be deenergized. The set initiation circuit 384 and the set delay circuit 392 are both deenergized because the contact K3-A3 and the set switch 388 are both in their open conditions. The stop initiation circuit 263 will also be deenergized since the contacts K3-A2, K4-A2 and K5-A2 will be in their open position.

The operational sequence indication circuit 368 will be entirely deenergized since all of the contacts associated therewith are in the open condition, thereby indicating that no operational sequence is in progress.

By virtue of deenergization of the relay K4B in the extend initiation circuit, the contact K4-B2 in the extend power circuit 340 will be in its open condition, thereby deenergizing the circuit 340 and the associated relay K7. The contacts K7-1 and K7-2 and K7-3 in the power conductors 102, 104 and 106 will be in the open condition, thereby preventing the introduction of electrical energy into the motor busses. The relay K8 in the retract power circuit 344 will be deenergized since its energizing contact K5-B2 is in the open condition, thereby causing the contacts K8-1, K8-2 and K8-3 in the power conductors 102, 104 and 106 to be opened. The power conductors therefore will be completely deenergized, preventing operation of the electrical motor. In the fully extended condition of the power operator as well as any other condition thereof, the high-low control circuitry may be controlling energization of the control system depending upon the position of the high-low control switch 504 as indicated hereinabove.

With reference to the individual position indicator circuitry in FIGURE 6B, the various position indicator circuits will be energized or deenergized responsive to energization of the associated contacts as related to energization or deenergization of the signal responsive relays. In the fully extended condition of the power operator, the deenergized condition of the signal relay K11 causes the contacts K11-1 and K11-A to be respectively in the closed condition and opened condition and causes relay 1K2A to be energized and 1K-2B to be deenergized. The relay 1K-2A opens the associated contact 1K2-A1 in the fail-safe hold control circuit 478, thereby deenergizing the relay 1K1 and opening the contact 1K1-1. The visual indicators 486 and 490 will be in the off position indicating that the fail-safe command circuit is inoperative in the fully extended position of the power operator.

Since the signal relay K12 is in an energized condition, the associated contacts K12-1 and K12-1A in the circuits 412 and 414, respectively, cause energization of the circuit 412 and deenergization of the circuit 414. The relay 1K3B becomes energized and its contact 1K3-B1, in the extended position indication circuit 420, is closed, thereby causing the signal lights 422 and 424 to be illuminated indicating that the power operator device is in a fully extended position. The retracted visual indicators 448 and 450 will be off because the relay 1K2–B1 will be in its open condition as governed by the deenergized relay 1K–2B in the circuit 404.

The set signal relay K13 will deenergize in the fully extended condition of the power operator mechanism and its associated relays K13–1 and K13A–1A will be respectively in their closed and open condition, energizing the associated relays 1K–4A and deenergizing the relay 1K–4B. The relay 1K–4B, being deenergized, opens the contact 1K–B1 and thereby maintains the fail-safe visual indicator circuit 434 in a deenergized condition. The contact 1K1–2 in the fail-safe visual indicator 434 is in its open condition by virtue of deenergization of its associated relay 1K1 in the fail-safe command or hold control circuit 478.

The fail-safe signal relay K14 will be in its energized condition since its associated switch 184 in the fail-safe motor circuit 182 will be closed. The relay K14 closes the contact K14–1 and opens the cotnact K14–1A causing energization of the relay 1K–5B and deenergization of the holding relay section 1K–5A. The normally opened contact 1K5–A1 in the retract visual indication circuit 460 will be opened, preventing energization of the visual indicator lights 448 and 450. The set position indication circuit 454 will be energized by the closed cotnact 1K5–B1 responsive to energization of its associated holding relay section 1K5B, thereby causing the visual indicator lights 456 and 458 to be illuminated indicating that the fail-safe mechanism of the power operator is in a set condition.

With the power operator mechanism and power operator circuitry in the extended position and assuming it is desired to move the power operator from the extended position to the retracted position, the personnel at the control station will depress the retract initiation switch 356, thereby energizing the retract initiation circuit 350 through the conductor 354. Since the contacts K10–1 and K12–2 are in their closed condition, the circuit 350 will become energized causing the relays K5–A and K5–B to move to their energized conditions. The contact K5–A3 associated with the relay K5–A will be closed, thereby allowing energization of the retract initiation circuit 350 through the power supply conductor 358. The retract initiation switch 356, upon being released by the personnel will move to its open condition deenergizing the conductor 354. The retract initiation circuit 350, however, will remain energized through the conductor 358 by virtue of the closed contact K5–A3. The retract power circuit 344 is energized by closing of the contact K5–B2 responsive to closing of its associated relay K5B in the retract initiation circuit 350. The retract power relay K8, when energized, causes the safety interlock K8–4 in the extend power circuit 340 to open to prevent simultaneous energization of the circuits 340 and 344. The power retract relay K8 also closes contact K8–1, K8–2 and K8–3 in the power conductors 102, 104 and 106, thereby energizing the motor buss circuits with alternating current of a predetermined phase sequence. The safety contact K8–5 in the control circuit power conductor 282 will be opened responsive to energization of the relay K8, thereby deenergizing the set extend and retract initiation circuits 386, 378 and 354. This prevents inadvertent energization of any of the circuitry while an operational sequence is in progress. Upon energization of the retract initiation circuit 350, the relay K5A will move its associated contact K5–A1 in the operational sequence indication circuit to the closed position, thereby illuminating the signal lights in the retract circuit to give an indication that the retract operation is in progress.

As the retract operation begins, the gear limit switch will move the retract switch 166 to its open position and will close extend switch 172 and the set switch 180. The switches 176 and 182 will remain closed during the immediate position of the power operator, therefore, the signal buss relays K9, K10, K11, K12, and K14 will all be energized while relay K13 remains energized. Relay K9 will close the contact K9–1 in the set initiation circuit 384 and contact K9–2 in the extend initiation circuit 376. The set and extend initiation circuits 384 and 376, however, under this condition will not be energized since it is necessary to close the respective set and extend initiation switchs 388 and/or 380 to cause initial energization thereof. During the immediate position of the power operator, it is impossible to initiate energization of the circuit 386 and 378 since the safety contact K8–5 is in its open condition deenergizing the power conductor 282. The relay K10 remains energized maintaining the contact K10–1 in the retract initiation circuit 350 in its closed positon. The signal relay K11 becomes energized in the intermediate position of the power operator as it moves from the extend to the retract position, causing the contacts K11–2 in the set delay circuit 392 to become opened deenergizing the circuit 392 and causing the contact K11–3 in the extend initiation circuit to be closed. The relay K12 remains energized maintaining the contact K12–2 in the retract initiation circuit 350 in its closed condition. Relay K13 becomes energized upon initial movement of the power operator construction between the extend and retract positions and causes opening of the contact K13–1 and closing of the contact K13–1A in the set signal circuits 426 and 428, respectively. The relay 1K4A therefore will become deenergized and the relay section 1K–4B will become energized, closing the contact 1K4–B1 in the fail-safe visual indication circuit 434 and illuminating the fail-safe signal lights 436 and 438. The set position indication circuit 454 including the signal lights 456 and 458 are also energized during the immediate position of the power operator mechanism. To accomplish this, the fail-safe signal switch 184 will be in its closed condition energizing the signal buss 146 and causing the fail-safe relay K14 to close the contact K14–1 to energize the circuit 440. This energizes the holding relay section 1K–5B, which closes the contact 1K5–B1 in the set position indication circuit 454. The relay K14 simultaneously opens the contact K14–1A in the circuit 442 causing deenergization of the holding relay section 1K–5A. The relay 1K–5A moves the contact 1K5–A1 in the retract signal circuit 460 to its open position.

In the intermediate operating condition of the power operator mechanism, the extended and retracted signal circuits 420 and 452 will both be energized through the closed contacts 1K3–B1 and 1K2–B1. The contact 1K3–B1 is closed responsive to energization of the relay 1K–3B, which in turn is energized when relay K12 closes the contact K12–1 in the circuit 412. The contract 1K2–B1 is closed by the relay 1K–2B in the circuit 404, which is energized responsive to closing of the contact K11–1A upon energization of the associated relay K11.

The operate visual indication circuit 462 will be energized upon closing of the contact K21–2 in the direct current power conductor 290 responsive to closing of the manually operated switch 294.

It is seen therefore that during the retracting operation of the power operator device the AC power circuit, the retract sequence indication circuit and the DC power circuit within the operational sequence indicational circuitry 368 will be energized. The AC power indication circuit and the DC power indication circuit are energized upon energization of the relay K1 and K21 in the power package circuitry. These circuits, of course, will remain energized during all positions of the power operator mechanism. During the retract operation, the visual indicator circuits of the individual circuitry will be energized as follows. The fail-safe command circuits 484 will be deenergized. Either the circuit 508 or 506 will be energized to indicate whether the high-low automatic control circuitry is in operation. The fail-safe signal circuit 434, the set circuit 454, the extended circuit 420 and the retracted circuit 452 will be energized, thereby giving a positive indication that the power operator device is operating at an immediate position. The operate circuit 462 will be energized, thereby indicating that direct current power is being supplied to the visual indicator circuitry. Upon reaching the fully retracted position, the signal buss control switches will be positioned by the gear limit switch in the following positions. The extend signal switch 160 will be closed energizing the conductor 158 and the signal buss 156. The retract signal switch 166 will be opened, however, the conductor 164 will be energized through the torque switch actuated contact 168. The extend signal switch 172 is closed energizing the conductor 170 and the signal buss 152. The retract signal switch 176 is in its open condition and the signal buss 150 controlling the retract relay K12 is deenergized. The set switch 180 is in its closed condition energizing the signal buss 148 through the conductor 178. The fail-safe signal switch 182 is in its open condition and the signal buss 146 associated therewith is deenergized. Therefore, it is seen that upon reaching the fully retracted condition, the relays K9 and K10 remain energized, the relays K11 and K13 become energized and the relays K12 and K14 become deenergized.

To move the power operator device from its fully retracted position to the extend position thereof assuming that the alternating current and direct current power is being provided to these various portions of the control circuitry, it is only necessary for the personnel at the control station to move the extend initiation switch 380 to its closed condition, thereby energizing the conductor 378 and the extend initiation circuit 376. The contacts K9–2 and K11–3 will be in their closed condition, allowing energization of the relays K4A and K4B. The relay K4A, when energized, closes the contact K4–A1 in the operational sequence indication circuit 368 illuminating the signal lights of the signal circuit 384 to indicate that the extend operation is in progress. The relay K4A also moves the contact K4–A2 in the stop initiation circuit 362 to its closed condition, thereby energizing the relay K2B. The relay K4B of the extend initiation circuit 376 closes contact K4–B1 and energizes the command conductor 280. The contact K4–B1 in the extend power circuit 340 is also closed upon energization of the relay K4B and causes the relay K7 to move its associated contacts to their closed position resulting in energization of the conductors 102, 104 and 106 with alternating current of the phase sequence necessary to rotate the motor of the power operator in the extend direction.

The signal light circuits of the individual power operator circuitry will be in the same condition as discussed above in regard to the intermediate position of the power operator device moving from its extended position to the retracted position. The fail-safe light, the set light and the extend, retract and operate visual indicators will all be energized to give an indication that the power operator mechanism is moving between the extended and retracted position. The direction of movement, however, is determined by the operational sequence indication circuit 384 which indicates that the operator is moving in an extend direction.

As pointed out above, the fail-safe mechanism of the power operator device may be actuated to move the power operator to its predetermined phase position either when the power operator is at the fully extended position or at an intermediate position. Actuation of the fail-safe operation may be selective, by manual closing of the fail-safe switch 480, automatic as determined by either excessively low or excessively high pressures by the high-low pressure control system or inadvertently by severing or otherwise damaging the fail-safe conductor 476. Assuming that the power operator device is operating between the retracted and extended positions and it is desired to cause manual fail-safe actuation, the personnel at the control station would merely depress the fail-safe command switch 480 energizing the conductor 478. Since the contact 1K2–A1 is normally closed in the intermediate and retract positions, the relay 1K1 will be energized upon closing the switch 480, thereby moving its asociated contact 1K1–1 to the closed position causing energization of the conductor 484, and illumination of the fail-safe signal lights 486 and 490. The relay 1K1 also closes the contact 1K1–2 in the fail-safe visual indication circuit 434 illuminating the signal lights 436 and 438 to indicate that the power operator has been moved to its safe condition. The relay 1K1 simultaneously opens contact 1K1–3 in the fail-safe hold conductor 476 thereby deenergizing the fail-safe hold conductor and the solenoid latch mechanism associated therewith. The fail-safe mechanism of the power operator upon deenergization of the solenoid latch mechanism will move the operator mechanism to its safe position as indicated hereinabove. Since the motor operation and control circuitry will remain energized, the motor will continue movement until it reaches the fully extended or fully retracted position at which position it will be deenergized by the motor control circuitry as discussed hereinabove.

For purposes of explanation, it is assumed that the fail-safe mechanism was actuated during movement of the power operator mechanism from the retracted to the extended position and that the motor continued to run until it reached the fully extended position causing the gear limit switch to open the switch contacts 172 and 180 deenergizing the signal busses 162 and 148. To rest the fail-safe mechanism of the power operator under this condition, the personnel at the control station will close the set initiation switch 388 energizing the circuit 386 and the set initiation circuit 384. The contact K6–1 will be closed at this time allowing energization of the relays K3A and K3B. The K3A relay closes contact K3–A3 allowing the set initiation circuit 384 to be energized through the power conductor 358. The relay K3B closes contact K3–B3 in the set delay circuit 392. The contact K11–2 in the circuit 392, however, will be in its open condition, thereby preventing the circuit 392 from becoming energized. The relay K3B in the set initiation circuit 384 causes closing of the contact K3–B2 in the extend power circuit 340 to energize the circuit 340 and the relay K7 causing power of a predetermined phase sequence to be applied to the motor busses 102, 104 and 106. As the power operator device reaches its fully extended position, the gear limit switch will move the extend switch contact 172 to its open position deenergizing the signal buss 152 and the relay K11. The relay K11 then moving to its deenergized position closes the contact K11–2 in the set delay circuit 392 energizing the set delay relay K6. The set delay relay K6, upon becoming energized, opens the contact K6–1 in the set initiation circuit 384, thereby deenergizing the set initiation circuit. The relay K3B, upon deenergization of the circuit 384 immediately opens the contact K3–B3, deenergizing the set delay circuit 392. The relay K6 being a delayed type relay is slow to move back to its deenergized position and, in effect, allows the motor of the power operator to be energized a sufficient length of time to move the fail-safe mechanism slightly past its normally fully extended position. This allows he detent mechanism to fully engage within the detent groove 88. In this condition the power operator motor will be deenergized and the force of the fail-safe spring 104 will be carried by the stem 24 and stem drive member 82. The power operator device then may be moved to its retracted or extended position as desired and the latching mechanism 90 will retain the spring retainer member 78 in the set position in readiness for a subsequent fail-safe actuation.

With the high-low pressure responsive circuitry in the automatic position as determined by the automatic switches 504, the fail-safe mechanism will be caused to move to the safe position in the event of either excessively high or excessively low fluid pressure. The pressure transducer 198, upon detecting either an excessively high or excessively low perssure, will relay this signal to the high-low pressure pickup module 494 through the transducer load circuitry 200 and 202. The module 494 will cause closing either of the contacts M1–1 or M1–2 in the power module circuit 500, thereby energizing the relay K15. The relay K15, when energized, causes closing of the contact K15–1 in the automatic fail-safe circuit 502. Here again, contact 1K2–A1 will be in its closed condition allowing energization of the relay 1K1 which actuates the fail-safe cycle in the manner described above.

Assuming that it is desired to stop movement of the power operator mechanism between the extended and retract position, the personnel at the control station will merely depress the stop switch 364 in the stop initiation circuit 362 deenergizing the holding relay section K2B and energizing the relay section K2A. The relay K2A, when energized, closes contact K2–A1 in the operational sequence indication circuit 368 causing the stop signal light to become illuminated. Relay K2A also opens the contact K2–A2 in the power circuit 358, thereby deenergizing the set initiation circuit 384, the extend initiation circuit 376 and the retract initiation circuit 350. Depending upon the direction of movement of the power operator device in the intermediate position, the circuit 340 or 344 depending upon the direction of motor movement will be deenergized, thereby opening the phase sequence selector contacts and deenergizing the motor buss conductors 102, 104 and 106. The visual indicator lights of the individual control circuitry will remain in the same condition as existed during the operation sequence because the signal relays K9, K10, K11, K12, K13 and K14 will remain energized in the immediate position of the power operator. After the stop operation has occurred, the power operator may be restarted in any desired direction merely by depressing the desired initiation switch.

While the discussion in regard to the power operator control circuitry has been generally confined to the operation of a single power operator, it is contemplated that a number of remotely power operator devices might be efficiently controlled by control circuitry in accordance with the spirit and scope of this invention. For example, as set forth in FIGURES 6D and 6E, individual control circuitry for a single operator is illustrated. As indicated by dash lines, however, the gang switching circuitry is operative to selectively switch the common control circuitry of the system to any of a number of individual control circuits of the type illustrated.

It will be evident from the foregoing that we have provided a novel power operator control system which will control a number of remotely located power operator devices, which may be submerged if desired, from a control facility which may be located a great distance from the power operator devices. The design of the control system is such that practically any number of remotely located power operator devices may be controlled by means of a single control cable, it being only necessary that the control system be initially designed for the control of a desired maximum number of power operator devices. It is also evident from the foregoing that a large variety of mechanical devices may be efficiently controlled by the system. For example, groups of production valves in a wellhead may be effectively controlled, pipeline valves, blowout preventers and other mechanical devices may be controlled through the same common control circuitry. An important feature of the invention is that the circuitry design allows each of the mechanical devices to be selectively and individually controllable, thereby obviating the necessity of controlling opening and closing of groups of devices as is presently done with submerged hydraulically energized power operator devices. The invention is provided with visual indicator means to effectively display the condition of the common control circuitry and also to indicate the condition of each of the individual control circuits at all times. The visual indicators therefore for a control system designed for controlling an entire petroleum field containing many wellhead assemblies, pipelines, etc., may be effectively reviewed on a control panel at the control station. While the visual indicator circuits of the individual control circuits visually indicate the condition of the associated power operator device at the last operating position thereof, it is a simple matter to rotate the gang switch to connect the individual control circuitry of a specified power operator with the common control circuitry, thereby interrogating the indiivdual control circuitry and bringing the system up-to-date. Employment of this invention for controlling remotely located wellhead assemblies effectively allows individual operation of one or more of the wellhead valves. For example, the wing valve of a wellhead assembly will frequently be the only valve which is operated to control the flow of fluid from the well. The integrity of the upper and lower master valve therefor is preserved which effectively eliminates wear on the valve parts and lends reliability to the valve system of the wellhead. The invention effectively allows the use of electrically operated power operators employing fail-safe devices, in remote such as undersea for example inaccessible areas. The control system effectively allows resetting of the fail-safe mechanisms from the control center after the fail-safe mechanism has become actuated in the manner set forth above. The invention effectively allows the control of remotely located power operator devices in response to varying pressure conditions. This is particularly adaptable to wellhead assembly control and allows the control system to automatically move the wellhead valve to a safe position responsive to predetermined unsafe pressure conditions within the wellhead itself. An unsafe rise or lowering of pressure within the wellhead above or below a predetermined pressure level would cause automatic closing of the valves of the wellhead assembly, thereby decreasing and virtually eliminating loss of, or damage to a well by unexpected pressure conditions. The visual indicator lights of the individual circuitry will automatically illumnate upon automatic, manual or inadvertent movement of the fail-safe mechanism of any of the power operators to the safe positions, thereby giving a positive indication of the condition of the power operator devices under all possible conditions. The invention therefor is one well adapted to obtain all of the objects hereinabove set forth together with other advantages which become obvious and inherent from the description of the apparatus itself.

It will be understood that certain combinations and subcombinations are of utility and may be employed without reference to other features and subcombinations.

This is contemplated by and is within the scope of the claims. As many possible embodiments may be made of the invention without departing from the spirit or the scope thereof, it is to be understood that all matters hereinabove set forth or shown in the accompanying drawings are to be interpreted as illustrative and not in a limiting sense.

What we claim is:

1. A system for controlling a plurality of electrically operated mechanical devices from a remote point including an electric motor connected to each of the devices, each motor having electrical operating circuitry, control circuitry at said remote point including common control circuitry for all of said motors and individual control circuitry for each of said motors, said individual circuitry being connected to the operating circuitry of the respective one of said motors, means for selectively connecting the individual control circutiry of a selected one of said motors to said common circuitry whereby one motor may be selectively operated to the exclusion of the other of said motors, a primary power supply for said system comprising externally supplied alternating current and internally supplied direct current converted from said alternating current, a power circuit connecting said primary power supply and the operating circuitry of each of said motors, said power circuit including means for selecting the phase sequence of alternating current transmitted thereby, said motor operating circuitry including switching means normally blocking the flow of current therethrough, said switching means when energized admitting the flow of current through said motor operating circuitry, said individual circuitry including a command circuit for each of said switching means for energizing the associated switching means, said common control circuitry controllably energizing the command circuit of a selected individual circuitry, a secondary power supply for said system comprising a battery and battery circuits, each motor having electrical operating circuitry connected to said primary power supply and control circuitry connected both to said primary power supply said said secondary power supply.

2. A system as set forth in claim 1, at least one of said devices having a fail-safe mechanism for moving the valve to a safe position, a fail-safe circuit for said fail-safe mechanism being normally energized and normally maintaining said fail-safe mechanism in a set condition, said fail-safe circuit being deenergized to initiate actuation of said fail-safe mechanism for moving said device to said safe position, means for deenergizing sail fail-safe circuit in response to predetermine conditions of said device.

3. A system as set forth in claim 2, said control circuitry including a delayed cutoff circuit for driving said motors to a position causing resetting of said fail-safe mechanism subsequent to movement of said fail-safe mechanism to the safe position.

4. A system as set forth in claim 1, a pressure transducer circuit interconnecting at least one of said devices and said control circuitry, said means for deenergizing said fail-safe circuit being responsive to said pressure transducer for deenergizing said fail-safe circuit in the event of excessively high or excessively low pressure within said device.

5. A system as set forth in claim 1, a single control cable interconnecting the circuitry at said remote point with the operating circuitry of said motors, said cable having sufficient power and control circuits for operation of said motors and a command circuit for each of said motors.

6. A system for controlling a plurality of valves from a remote point comprising an electric motor connected to each valve and adapted for driving the same between open and closed position, a primary power supply for said system comprising a source of externally supplied alternating current and a source of internally supplied direct current converted from said alternating current, a secondary battery powered direct current power supply source for said system, each motor having electrical operating circuitry connected to said alternating current source of said primary power supply and control circuitry connected to said source of internally supplied direct current of said primary power supply and connected to said secondary battery powered direct current power supply, a fail-safe mechanism for at least one of the valves of said system for moving the respective valve to a predetermined safe position, a fail-safe circuit connected both to said primary and secondary power supply means for energizing said fail-safe mechanism and maintaining the same in a set condition, said secondary power supply maintaining said fail-safe mechanism in said set condition upon failure of said primary power supply.

7. A system as set forth in claim 6, a fail-safe mechanism for each valve for moving the valve to a predetermined safe position, electrically energized means normally maintaining said fail-safe mechanism in a set position, said system having a fail-safe circuit for energizing said electrically energized means, said fail-safe circuit being deenergized responsive to predetermined valve and control system conditions for moving said valves to their safe position.

8. A system for selectively or simultaneously controlling a plurality of remotely located mechanical devices comprising an electric motor for driving each of said devices, a primary power supply for said system comprising a source of externally supplied alternating current and a source of internally supplied direct current converted from said alternating current, a secondary power supply for said system comprising a battery and battery circuitry for said system, each motor having electrical operation and control circuitry normally electrically disconnected from said primary and secondary power supply means, said secondary power supply being disposed in parallel with said source of internally supplied direct current and being operative to provide direct current to said system in the event of failure of said primary power supply, selection means for selectively connecting the motor operation and control circuitry of at least one of said motors to said power source, switching circuitry in each of said motor operation circuits for controlling the flow of electrical current through the operation circuitry of each of said motors, command circuits extending for said power supply to said switching circuitry and being selectively energized to cause energization of said switching circuitry, said switching circuitry upon becoming energized allowing the flow of electrical energy through said motor operation circuits causing operation of a selected one or more of said motors.

9. A system for controlling a plurality of remotely located mechanical devices comprising an electric motor for driving each of said devices, a primary power supply for said system comprising a source of externally supplied alternating current and a source of internally supplied direct current converted from said alternating current, a secondary power supply for said system comprising a battery and battery circuitry, each motor having electrical operation and control circuitry normally electrically disconnected from said primary and secondary power supply means, said secondary power supply being connected in parallel with said source of internally supplied direct current and being operative to provide direct current to said system in the event of failure of said primary power supply, selection means for selectively connecting the motor operation and control circuitry at least one of said motors to said power source, switching circuitry in each of said motor operation circuits for controlling the flow of electrical current through the operation circuitry of each of said motors, a command circuit extending from said power supply to said switching circuitry and being selectively energized to cause energization of said switching circuitry, said switching circuitry upon becoming energized allowing the flow of electrical energy through said motor operation circuits causing operation of the selected one or more of said motors, position indicator means energized by said internally supplied direct current and upon failure of said primary power supply being energized by said secondary power supply to indicate the position of said devices.

References Cited

UNITED STATES PATENTS

| | | | |
|---|---|---|---|
| 2,883,597 | 4/1959 | Eck | 318—103 |
| 3,309,593 | 3/1967 | Egglestone et al. | 318—227 |
| 3,317,741 | 5/1967 | McClain | 307—64 |

ORIS L. RADER, *Primary Examiner.*

B. A. COOPER, *Assistant Examiner.*

U.S. Cl. X.R.

137—554, 635; 251—69; 307—64; 318—490

PO-1050
(5/69)

UNITED STATES PATENT OFFICE
CERTIFICATE OF CORRECTION

Patent No. 3,422,329                    Dated January 14, 1969

Inventor(s) Clifford E. Anderson, Ellis M. Zacharias, Jr.

It is certified that error appears in the above-identified patent and that said Letters Patent are hereby corrected as shown below:

Column 6, line 38, "30" should read -- 40 --; line 72, "smiplicity" should read -- simplicity --

Column 8, line 53, "Whe" should read -- When --

Column 14, line 4, after "initiation" insert -- circuit -- .

Column 15, line 45, "cirruit" should read -- circuit --

Column 17, line 72, "full" should read -- fully --

Column 19, line 48, "K-50" should read -- K15 --

Column 20, line 11, "initaition" should read -- initiation --; line 24, "constructor" should read -- construction --; line 56, "6B" should read -- 6D --; line 62, "K11-A" should read -- K11-1A --; line 64, "1K2A" should read -- 1K-2A --; line 75, "1K3B" should read -- 1K-3B --

Column 21, line 10, "K13A-1A" should read -- K13-1A --; line 14, "1K-B1" should read -- 1K4-B1 --; line 16, after "indicator" insert -- circuit --; line 29, "cotnact" should read -- contact --

Column 24, line 4, "asociated" should read -- associated --; line 29, "rest" should read -- reset --

Column 25, line 48, after "any" insert -- one --

Column 26, line 10, "specified" should read -- specific --; line 11, "indiivdual" should read -- individual --; line 41, "illumnate" should read -- illuminate --

Signed and sealed this 15 day of June 1971.

(SEAL)
Attest:

EDWARD M. FLETCHER, JR.                    WILLIAM E. SCHUYLER, JR.